US009010205B2

(12) United States Patent
Schroeder et al.

(10) Patent No.: US 9,010,205 B2
(45) Date of Patent: Apr. 21, 2015

(54) LINEAR SLIDE HAVING INTEGRAL CARRIAGE AND NUT ASSEMBLY

(75) Inventors: Jonathan R. Schroeder, Machesney Park, IL (US); Joseph A. Binka, Belvidere, IL (US); Timothy J. LeCrone, Rockford, IL (US)

(73) Assignee: Pacific Bearing Company, Rockford, IL (US)

( * ) Notice: Subject to any disclaimer, the term of this patent is extended or adjusted under 35 U.S.C. 154(b) by 474 days.

(21) Appl. No.: 13/351,587

(22) Filed: Jan. 17, 2012

(65) Prior Publication Data

US 2012/0186374 A1 Jul. 26, 2012

Related U.S. Application Data

(60) Provisional application No. 61/434,627, filed on Jan. 20, 2011.

(51) Int. Cl.
*F16H 25/12* (2006.01)
*F16H 25/20* (2006.01)
*F16C 29/00* (2006.01)

(52) U.S. Cl.
CPC ............... *F16H 25/20* (2013.01); *F16C 29/00* (2013.01); *F16H 2025/204* (2013.01)

(58) Field of Classification Search
CPC ............ F16H 2025/204; F16H 2025/2034; F16H 2025/2031; F16H 2025/2037; F16C 29/063; F16C 29/0692
USPC ............. 74/89.32, 89.33, 89.3, 89.23, 89.38, 74/424.71, 424, 72, 424.95
See application file for complete search history.

(56) References Cited

U.S. PATENT DOCUMENTS

| 2,228,244 | A |   | 1/1941  | Baker    |         |
|-----------|---|---|---------|----------|---------|
| 2,348,611 | A |   | 5/1944  | Davidson |         |
| 2,610,519 | A | * | 9/1952  | Rokos    | 74/441  |
| 3,023,631 | A | * | 3/1962  | Curtis   | 74/89.32|
| 3,359,792 | A |   | 12/1967 | Lukens   |         |
| 3,640,138 | A | * | 2/1972  | Hahn et al. | 74/89.32|
| 3,656,358 | A |   | 4/1972  | Kopp     |         |
| 3,713,932 | A |   | 1/1973  | Butzow et al. |     |
| 3,977,262 | A | * | 8/1976  | Randolph | 74/89.36|

(Continued)

FOREIGN PATENT DOCUMENTS

GB    2 408 301 A    5/2005
JP    61228157 A    10/1986

(Continued)

OTHER PUBLICATIONS

Haydon Kerk News; date last visited Jan. 13, 2012; 1 page printed from Internet; http://www.haydonkerk.com/News/tabid/231/novusact/viewarticie/Default.aspx?articleid=GMUPZ00Xgo.

(Continued)

*Primary Examiner* — William Kelleher
*Assistant Examiner* — Valentin Craciun
(74) *Attorney, Agent, or Firm* — Reinhart Boerner Van Deuren P.C.

(57) ABSTRACT

A linear slide is provided. The linear slide includes a guide rail, a carriage arrangement and a drive mechanism. The carriage arrangement includes a sidecar or nut arrangement for engagement with a screw of the drive mechanism. The nut arrangement is laterally offset from a carriage of the carriage arrangement.

8 Claims, 25 Drawing Sheets

(56) References Cited

U.S. PATENT DOCUMENTS

| | | | |
|---|---|---|---|
| 4,131,031 A | 12/1978 | Erikson et al. | |
| 4,210,033 A | 7/1980 | Erikson et al. | |
| 4,249,426 A | 2/1981 | Erikson et al. | |
| 4,274,294 A | 6/1981 | Siryj et al. | |
| 4,282,764 A | 8/1981 | Harris | |
| RE32,433 E | 6/1987 | Erikson et al. | |
| 4,802,374 A * | 2/1989 | Hamelin et al. | 74/89.14 |
| 4,953,418 A * | 9/1990 | Hirose | 74/89.32 |
| 4,954,032 A | 9/1990 | Morales | |
| 5,027,671 A | 7/1991 | Erikson et al. | |
| 5,097,716 A * | 3/1992 | Barbat et al. | 74/89.32 |
| 5,107,716 A * | 4/1992 | Torii et al. | 74/490.03 |
| 5,146,802 A * | 9/1992 | Yanagisawa | 74/89.3 |
| 5,195,391 A * | 3/1993 | Barbat et al. | 74/89.22 |
| 5,303,606 A | 4/1994 | Kokinda | |
| 5,329,825 A * | 7/1994 | Askins | 74/89.32 |
| 5,456,134 A * | 10/1995 | Bouwer et al. | 74/490.09 |
| 5,601,372 A | 2/1997 | Erikson et al. | |
| 5,676,016 A * | 10/1997 | Nagai et al. | 74/89.32 |
| 5,720,202 A * | 2/1998 | Senjo et al. | 74/89.36 |
| 5,732,592 A * | 3/1998 | Parker | 74/89 |
| 5,732,596 A * | 3/1998 | Erikson et al. | 74/441 |
| 5,769,377 A | 6/1998 | Gauger | 248/429 |
| 5,839,321 A * | 11/1998 | Siemons | 74/441 |
| 5,913,940 A | 6/1999 | Erikson et al. | |
| 5,913,941 A | 6/1999 | Erikson et al. | |
| 5,937,702 A | 8/1999 | Erikson et al. | |
| 6,041,671 A | 3/2000 | Erikson et al. | |
| 6,053,062 A * | 4/2000 | Ishikawa et al. | 74/89.32 |
| 6,099,166 A | 8/2000 | Erikson et al. | |
| 6,117,249 A | 9/2000 | Erikson et al. | |
| 6,131,478 A | 10/2000 | Erikson et al. | |
| 6,148,714 A * | 11/2000 | Abe et al. | 92/88 |
| 6,202,500 B1 * | 3/2001 | Erikson et al. | 74/89.42 |
| 6,240,798 B1 | 6/2001 | Erikson et al. | |
| 6,415,673 B1 | 7/2002 | Erikson et al. | |
| 6,422,101 B2 | 7/2002 | Erikson et al. | |
| 6,467,362 B2 | 10/2002 | Erikson et al. | |
| 6,581,508 B2 * | 6/2003 | Kudo et al. | 92/85 R |
| 6,662,672 B2 * | 12/2003 | Someya | 74/89.23 |
| 6,880,417 B2 | 4/2005 | Nagai et al. | |
| 7,219,570 B2 | 5/2007 | Erikson et al. | |
| 7,410,201 B1 * | 8/2008 | Wilson et al. | 296/146.16 |
| 7,481,126 B2 * | 1/2009 | Las Navas Garcia | 74/89.23 |
| 7,506,557 B2 | 3/2009 | Hosokai et al. | |
| 7,552,657 B2 | 6/2009 | Erikson et al. | |
| 7,794,150 B2 * | 9/2010 | Keller et al. | 384/45 |
| 7,878,082 B2 * | 2/2011 | Yamagishi | 74/89.33 |
| 7,891,265 B2 | 2/2011 | Erikson et al. | |
| 7,992,456 B2 | 8/2011 | Schroeder et al. | |
| 8,028,594 B2 | 10/2011 | Schroeder | |
| 8,042,416 B2 * | 10/2011 | Pfister | 74/89.33 |
| 8,579,343 B2 * | 11/2013 | Park et al. | 294/111 |
| 2004/0093971 A1 | 5/2004 | Fujibayashi | |
| 2005/0199451 A1 * | 9/2005 | Zimmer et al. | 188/67 |
| 2005/0257633 A1 * | 11/2005 | Yamagishi | 74/89.33 |
| 2006/0207359 A1 * | 9/2006 | Kowalski | 74/89.23 |
| 2007/0295128 A1 | 12/2007 | Erikson et al. | |
| 2008/0119294 A1 | 5/2008 | Erikson et al. | |
| 2008/0190225 A1 * | 8/2008 | Pfister | 74/89.23 |
| 2009/0249910 A1 | 10/2009 | Erikson et al. | |
| 2009/0314111 A1 * | 12/2009 | Schunke | 74/89.32 |

FOREIGN PATENT DOCUMENTS

| | | |
|---|---|---|
| JP | 2001-221313 A | 8/2001 |
| JP | 2001-280440 A | 10/2001 |
| JP | 2003-240098 A | 8/2003 |
| WO | WO 2006/106817 A1 | 10/2006 |

OTHER PUBLICATIONS

U.S. Appl. No. 61/579,699, filed Dec. 23, 2011, Schroeder et al.

* cited by examiner

LINEAR SLIDE HAVING INTEGRAL CARRIAGE AND NUT ASSEMBLY

CROSS-REFERENCE TO RELATED PATENT APPLICATIONS

This patent application claims the benefit of U.S. Provisional Patent Application No. 61/434,627, filed Jan. 20, 2011, the entire teachings and disclosure of which are incorporated herein by reference thereto.

FIELD OF THE INVENTION

The present invention generally relates to linear slides that include a guide rail, a guide carriage, and a drive mechanism for driving the carriage along the guide rail.

BACKGROUND OF THE INVENTION

Linear slides are used for transporting devices along a known path. Typically the devices are translated both forward and backward along the path. The linear slide may include a drive mechanism for manually or automatically driving a guide carriage along a guide rail of the linear slide.

Some of the guide carriages will use internal ball bearings that recirculate through a body of the guide carriage. The ball bearings will ride on raceway portions of the guide rail to facilitate low friction translation of the guide carriage along the guide rail. Some guide carriages utilize guide wheels that ride along the guide rail.

Most linear slides are formed from a linear guide having a guide rail and a guide carriage. A drive mechanism is then attached to a top surface of the guide carriage to provide a drive mechanism for moving the guide carriage. Unfortunately, this requires attaching the drive mechanism to the top mounting surface of the guide carriage. This mounting arrangement results in interference with the ability to mount the desired devices to be transported by the linear slide to the guide carriage.

The present invention relates to improvements over the current state of the art of linear slides.

BRIEF SUMMARY OF THE INVENTION

Embodiments of the present invention relate to improved linear slide arrangements and methods of forming new and improved linear slide arrangements.

A particular embodiment of a linear slide according to the present invention includes a guide rail; a carriage arrangement mounted to the guide rail for movement therealong; and a drive mechanism coupled to the carriage arrangement to move the carriage arrangement along the guide rail, the drive mechanism being spaced laterally to a side of the guide rail.

In a particular implementation of the linear slide, the carriage arrangement includes a carriage and a nut arrangement. The nut arrangement is coupled to the drive mechanism and the carriage. The carriage has a top surface to which objects are to be mounted. The nut arrangement is positioned, at most, flush with the top surface of the carriage. This allows the linear slide to be swapped with a prior profile rail that did not include a drive mechanism without adjusting the mounting of the object.

In a further particular implementation, the nut arrangement is in the form of a sidecar. The sidecar being mechanically fixed to the carriage in a fixed position.

In one embodiment, the carriage arrangement includes a carriage and a nut in fixed relation to the carriage. The carriage includes a carriage body, a pair of ball guides on opposite sides of the carriage body and an end cap attached at an end of the carriage. The nut being fixedly attached to the end cap.

In one embodiment, the end cap includes a pair of flanges that extend in a direction extending laterally away from one of the sides of the carriage. The nut is fixedly attached to the pair of flanges.

In one embodiment, the carriage arrangement includes a carriage portion and a nut portion that couples the carriage arrangement to the drive mechanism. The carriage includes at least one ball guide forming at least a portion of a side of the carriage. The ball guide defines the nut portion.

In one embodiment, he carriage arrangement includes a carriage and a nut that couples the carriage arrangement to the drive mechanism. The carriage includes at least one ball guide forming at least a portion of a side of the carriage. The nut being fixedly attached to the ball guide.

In one embodiment, the carriage arrangement includes a carriage and a nut that couples the carriage arrangement to the drive mechanism. The carriage includes a carriage body that defines a top surface to which devices are to be mounted. The carriage body includes a mounting portion extending laterally outward beyond a side of the carriage. The nut being mounted to the mounting portion.

In one embodiment, a main body is attached to the mounting portion to a side opposite the top surface. The main body defines a nut channel in which the nut is mounted.

In one embodiment, the carriage arrangement includes a carriage and a sidecar affixed to the carriage. The sidecar includes a nut portion that couples the carriage arrangement to the drive mechanism. The sidecar includes a frame structure that is fixedly attached to the carriage. The frame structure defines a nut channel in which the nut portion is affixed.

In one embodiment, the sidecar further includes an anti-backlash nut portion and a biasing member within the nut channel. The biasing member biases the anti-backlash nut portion away from the nut portion. The anti-backlash nut portion is axially slidable within the nut channel.

In one embodiment, the sidecar is affixed to the carriage in such a manner that the sidecar is at most flush with a top surface of the carriage.

In one embodiment, the carriage includes a carriage body that defines a top surface to which objects are to be mounted. The carriage body includes a mounting cavity formed therein and recessed into or below the top surface. The sidecar includes a cantilevered attachment portion that is sized to mate with the mounting cavity.

In one embodiment, the carriage body includes a mounting recess formed in the mounting cavity and the attachment portion includes a mounting aperture. A mounting pin extends into both the mounting recess and the mounting aperture to affix the sidecar to the carriage body.

In one embodiment, the sidecar is not attached to the top surface of the carriage.

In one embodiment, a linear slide including a guide rail; a carriage arrangement mounted to the guide rail for movement therealong, the carriage arrangement including: a carriage movably coupled to the guide rail, the carriage defining a top surface to which objects are to be mounted; a nut being in fixed relation to the carriage, the nut being positioned at most vertically flush with the top surface; a drive mechanism coupled to the nut to move the carriage arrangement along the guide rail, the drive mechanism being spaced laterally to a side of the guide rail is provided.

In one embodiment, the nut is laterally offset from the guide rail when the carriage arrangement is mounted to the guide rail.

In one embodiment, the carriage arrangement includes a sidecar. The nut is a portion of the sidecar. The sidecar is attached to the carriage. The sidecar includes a main body affixed to the carriage. The nut being affixed to the main body.

In one embodiment, the carriage includes a carriage body defining the top surface. The carriage body defines a mounting cavity being vertically below the top surface. The sidecar includes a cantilevered attachment portion mating with the mounting cavity such that the sidecar is not attached to a top surface of the carriage.

In one embodiment, the carriage includes a carriage body defining the top surface. The carriage body defines a mounting cavity being vertically below the top surface. The sidecar includes a cantilevered attachment portion mating with the mounting cavity, such that the sidecar is not attached to a top surface of the carriage.

In one embodiment, the carriage includes a carriage body defining the top surface, a pair of ball guides affixed to the carriage body and extending along sides of the carriage body and an end cap attached to the carriage body and the pair of ball guides. The nut is affixed to the end cap.

In one embodiment, the end cap includes a pair of laterally extending flanges extending laterally outward in a direction extending away from the guide rail. The nut is attached to the pair of laterally extending flanges such that the nut is laterally offset from the guide rail.

In one embodiment, a method of forming a linear slide is provided. The method includes removing a first end cap from a carriage arrangement; attaching a second end cap to the carriage arrangement; mounting the carriage the carriage arrangement to a guide rail; coupling a nut, carried by the second end cap, to a drive mechanism.

In one method, the method further includes attaching the nut to the second end cap.

In one method, the step of attaching the nut to the second end cap occurs after the step of attaching the second end cap to the carriage arrangement.

In one method, the second end cap includes a pair of flanges that extend in a direction extending away from the guide rail, when mounted to the guide rail. The nut is mounted to the pair of flanges.

In one embodiment, a method of forming a linear slide is provided. The linear slide has a carriage arrangement that includes a top surface to which objects are to be mounted. The method includes affixing a nut to a carriage of the linear slide such that the attachment of the nut does not interfere with the top surface of the carriage arrangement.

In a particular embodiment of the method, the carriage arrangement includes a carriage that defines the top surface of the carriage arrangement and a sidecar. Affixing the nut to the carriage includes attaching the sidecar to the carriage such that the sidecar is at most flush with the top surface.

In one embodiment of the method, the carriage includes a carriage body that defines the top surface. The method further includes forming a mounting cavity into the carriage body and affixing includes mating a cantilevered attachment portion of the sidecar with the mounting cavity.

In one embodiment, the method further includes machining the mounting cavity from the carriage body.

In one method, the method further includes fastening the sidecar to the carriage body with a fastener extending into a recess formed in the attachment portion of the sidecar and a recess formed in the carriage body.

A further embodiment of a linear slide arrangement including a guide rail; a carriage portion defining a top surface to which objects are to be mounted, the carriage movably mounted to the guide rail for motion therealong; a sidecar portion in fixed relation to the carriage portion and at most flush with the top surface; and a drive mechanism attached to the sidecar portion to drive the carriage portion along the guide rail is provided.

In one embodiment, the sidecar portion and the carriage portion are discrete units attached to one another.

In one embodiment, the sidecar portion is a laterally extending portion of the carriage portion. The sidecar portion includes a nut that engages the drive mechanism and is attached to the laterally extending portion of the carriage portion.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
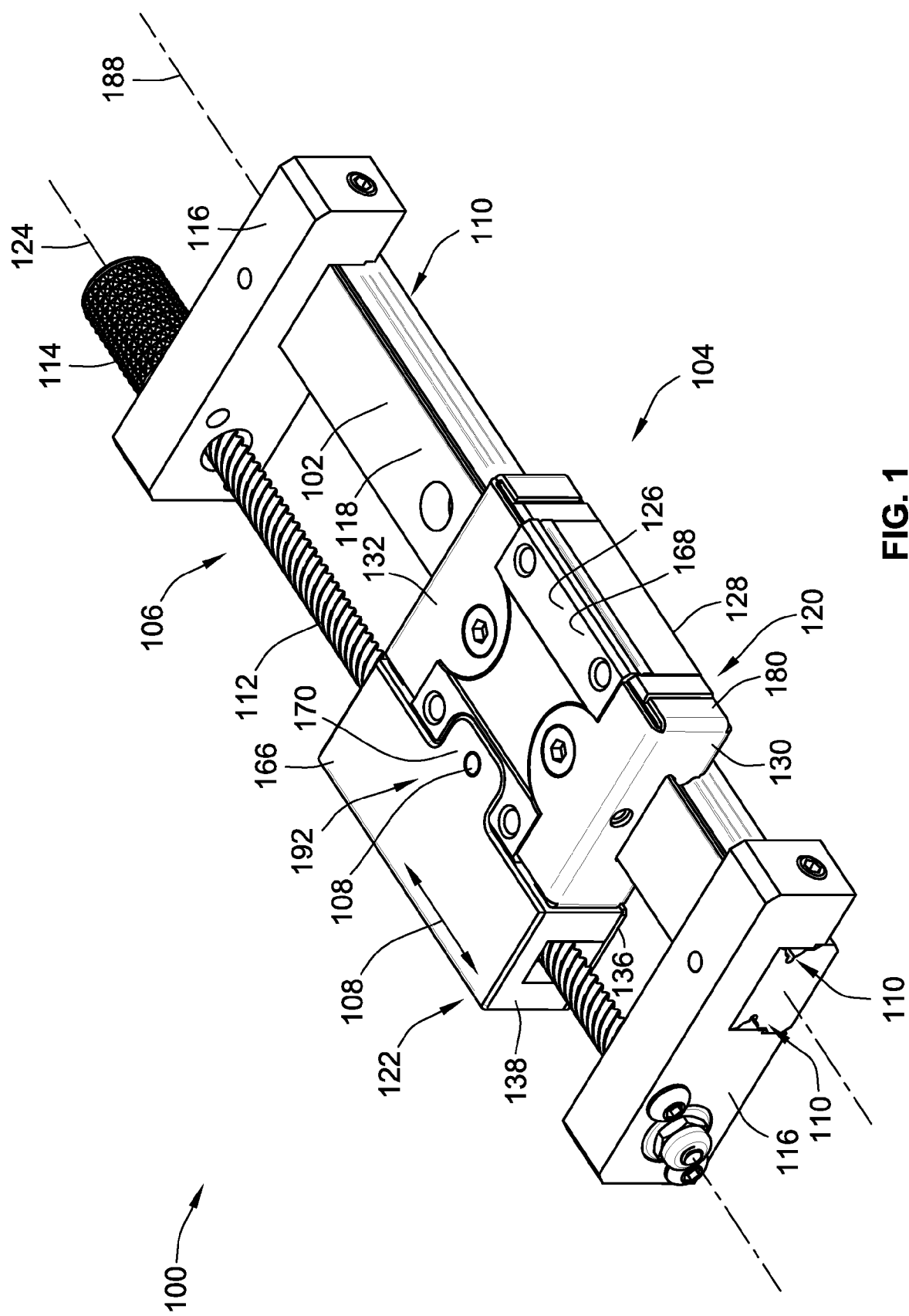
FIG. 1 is a top perspective illustration of a linear slide arrangement according to a first exemplary embodiment of the invention.

Turning now to FIG. 1, an exemplary embodiment of a linear slide arrangement 100 is illustrated. The linear slide arrangement 100 generally includes a guide rail 102, a carriage arrangement 104, and a drive mechanism 106. The linear slide arrangement 100 is used to translate devices (not shown) attached to the carriage arrangement 104 linearly back and forth along the guide rail 102 (as illustrated by arrow 108). The guided arrangement of carriage arrangement 104 allows for repeatability in the motion of the attached device.

The guide rail 102 is typically formed from an extruded base material such as aluminum and includes raceways 110. The carriage arrangement 104 (will include corresponding guide devices such as guide wheels, recirculating ball bearings, lubricious material that interact with the raceways 110 as the carriage arrangement 104 is translated along the guide rail 102. In the illustrated embodiment, the raceways 110 are illustrated as channels that are merely extruded into the shape of the guide rail 102. However, in alternative embodiments the raceways 110 could be machined into the guide rail 102 or formed by hardened steel raceways that are mechanically or otherwise affixed to the guide rail 102. Further, the raceways 110 are illustrated as channels formed in the sides of the guide rail 102. The channels have a cross sectional shape that is generally referred to as a "gothic arch." However, in alternative embodiments the raceways 110 need not be in the form of channels but could be in "V"-shaped or other shaped protrusions. These protrusions would typically be used in combination with guide wheel type carriages. The current raceways 110 are designed for use with the recirculating ball bearing type carriage arrangements.

The linear slide arrangement 100 of FIG. 1 includes a manual drive mechanism 106. The drive mechanism 106 includes a screw 112 that has a handle 114 on one end that can be gripped by a user to rotate the screw for fine adjustment of the position of carriage arrangement 104 along guide rail 102.

The screw 112 operably engages the carriage arrangement 104 such that rotational motion of the screw 112 is converted into linear motion of the carriage arrangement 104 along the guide rail 102.

The screw 112 is laterally offset from the guide rail 102 by a pair of end blocks 116 affixed to the guide rail 102. In the illustrated embodiment, the end blocks 116 are positioned adjacent to distal ends of the guide rail 102.

The end blocks 116 include through apertures through which the screw 112 extends. The through apertures may include bearing supports for supporting the screw 112 for low friction rotation relative to end blocks 116. These bearings may be bushings, roller bearings, or other low friction style bearing mechanisms.

In a preferred embodiment, the screw 112 is vertically below a horizontal plane defined by the top surface 118 of the guide rail 102.

As will be illustrated in other embodiments of the present invention, the drive mechanism 106 could be provided with a motor for automatically controlling rotation of the screw 112.

The carriage arrangement 104 generally includes a carriage portion 120 (also referred to as a carriage) and a nut arrangement in the form of sidecar 122 in the illustrated embodiment. The sidecar 122 is laterally offset to one side of the carriage portion 120 and receives screw 112 therethrough. The carriage portion 120 generally rides along and is guided by the guide rail 102 with the guide rail 102 extending through a channel formed in carriage portion 120. The carriage portion 120 generally includes a pair of wing portions that extend along sides of the guide rail 102 such that the carriage portion 120 generally straddles the guide rail 102. The wing portions generally define the channel therebetween that receives the guide rail 102. The sidecar 122 generally operably engages the screw 112 to convert the rotational motion of screw 112 about its longitudinal axis 124 into linear motion of the carriage arrangement 104, as illustrated by arrow 108.

Figure 4:
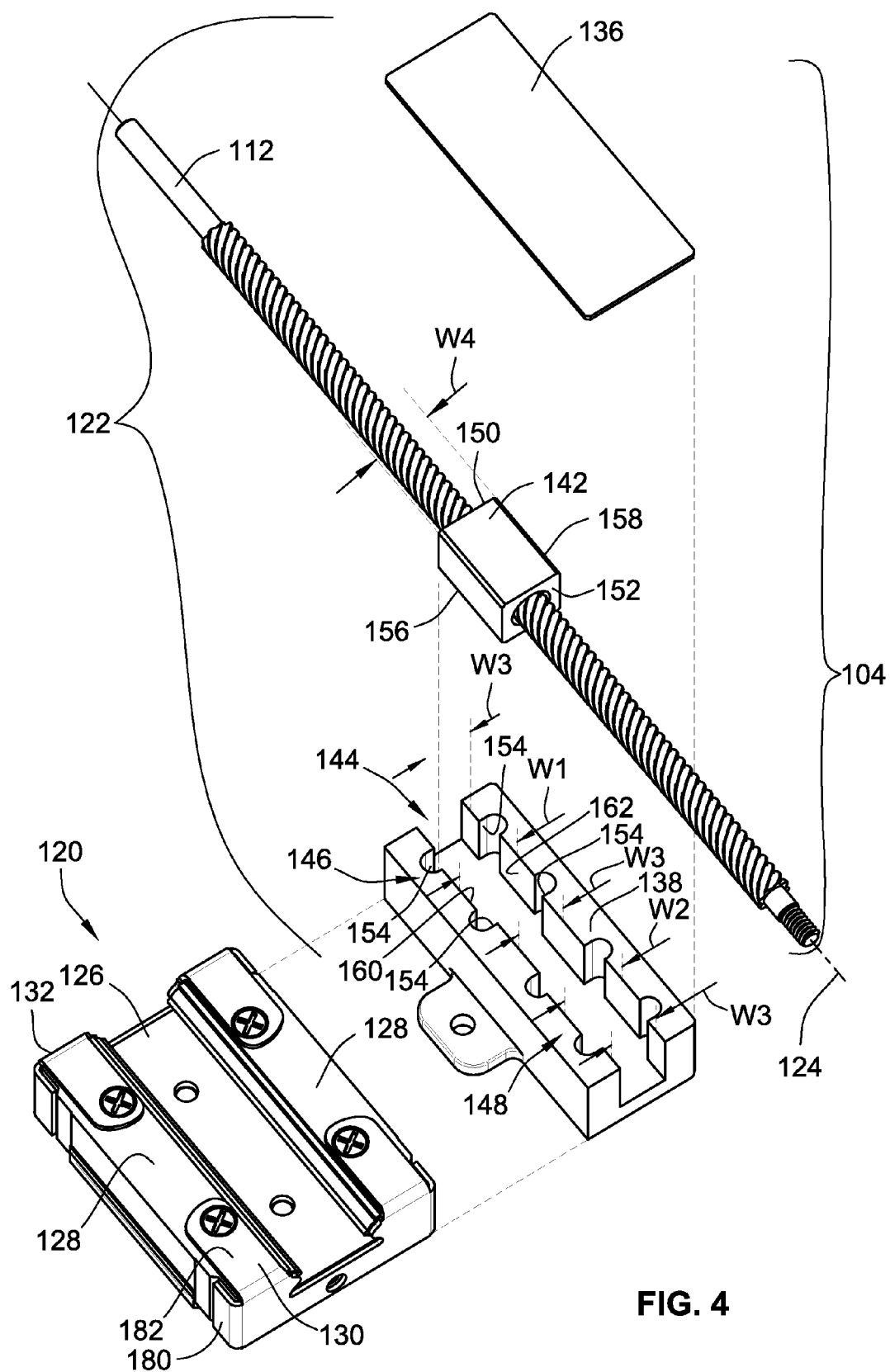
FIG. 4 is a simplified exploded view of the carriage arrangement of the linear slide arrangement of FIG. 1.

With additional reference to FIG. 4, the carriage portion 120 is generally an assembly of components. The assembly of components typically includes a metal carriage body 126, a pair of plastic ball guides 128 attached to carriage body 126, a pair of metal end caps 130, 132, and a plurality of recirculating ball bearings (not shown) within the carriage portion 120.

The carriage portion 120 generally defines a pair of circulating paths through which the ball bearings are passed as the carriage portion 120 travels along the guide rail 102. These pathways along which the ball bearings travel can be formed in part by the carriage body 126 as well as plastic ball guides 128. The end caps 130, 132 can also define a portion of the recirculating pathways as well as to assist in securing the plurality of components of the carriage portion 120 into a complete component.

With reference to FIG. 4, the end caps 130, 132 are screwed into a bottom surface of plastic ball guides 128 as well as into the carriage body 126.

The end caps 130, 132 are typically formed from stamped or wire cut thin stainless steel or aluminum.

The carriage body 120 is typically formed from steel making the component difficult to machine.

Figure 2:
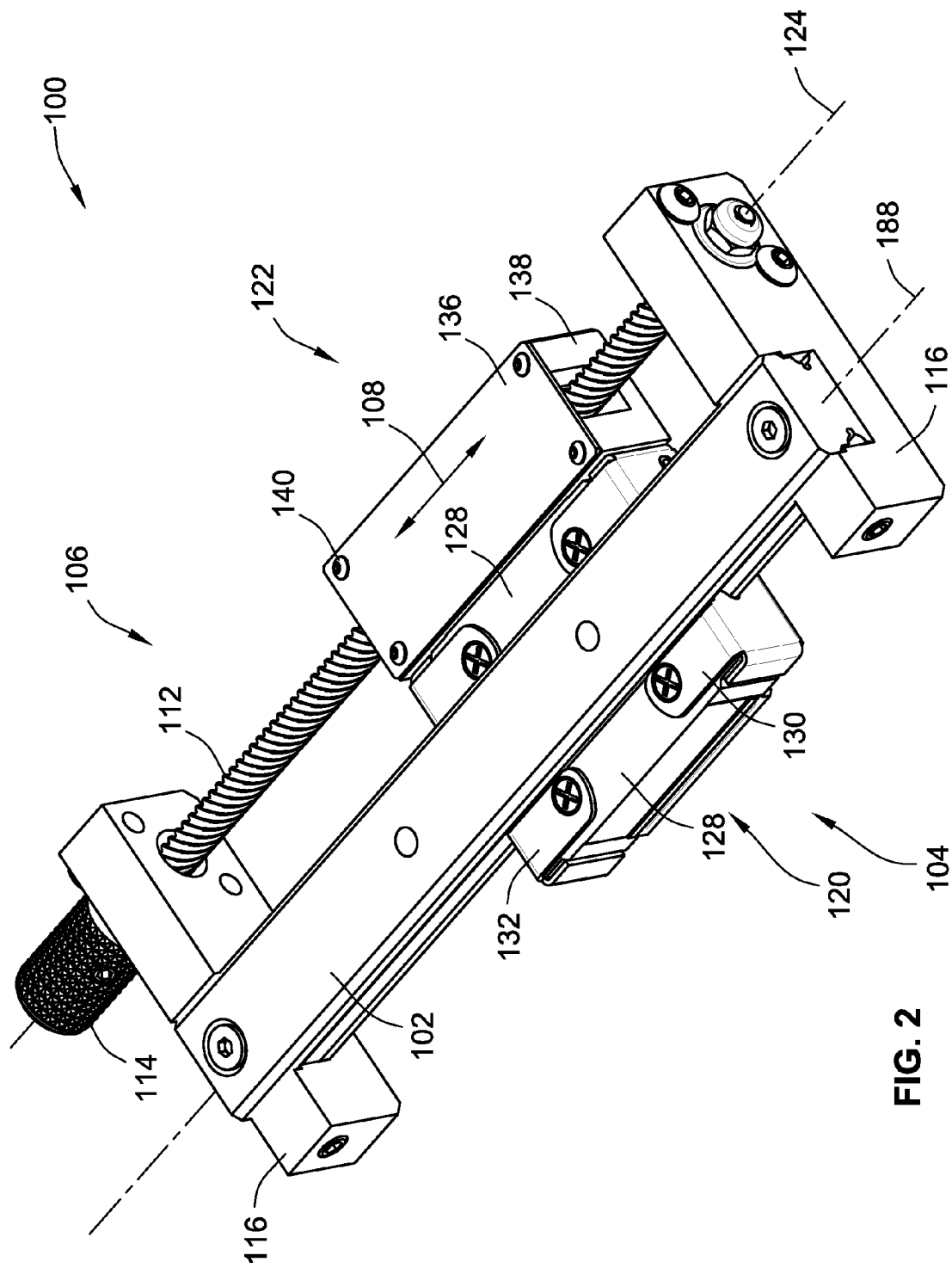
FIG. 2 is a bottom perspective illustration of the linear slide arrangement of FIG. 1.

The sidecar 122 includes a bottom cover 136 and a main body 138 that cooperate with one another. The bottom cover 136 is best viewed in FIG. 2. The bottom cover 136 can be attached to the main body by screws 140. However, other mechanisms for securing the bottom cover 136 to main body 138 can be provided. For instance, the main body 138 and bottom cover 136 can be snap engaged to one another. Alternatively, they could be welded such as by ultrasonic welding, to one another.

Figure 3:
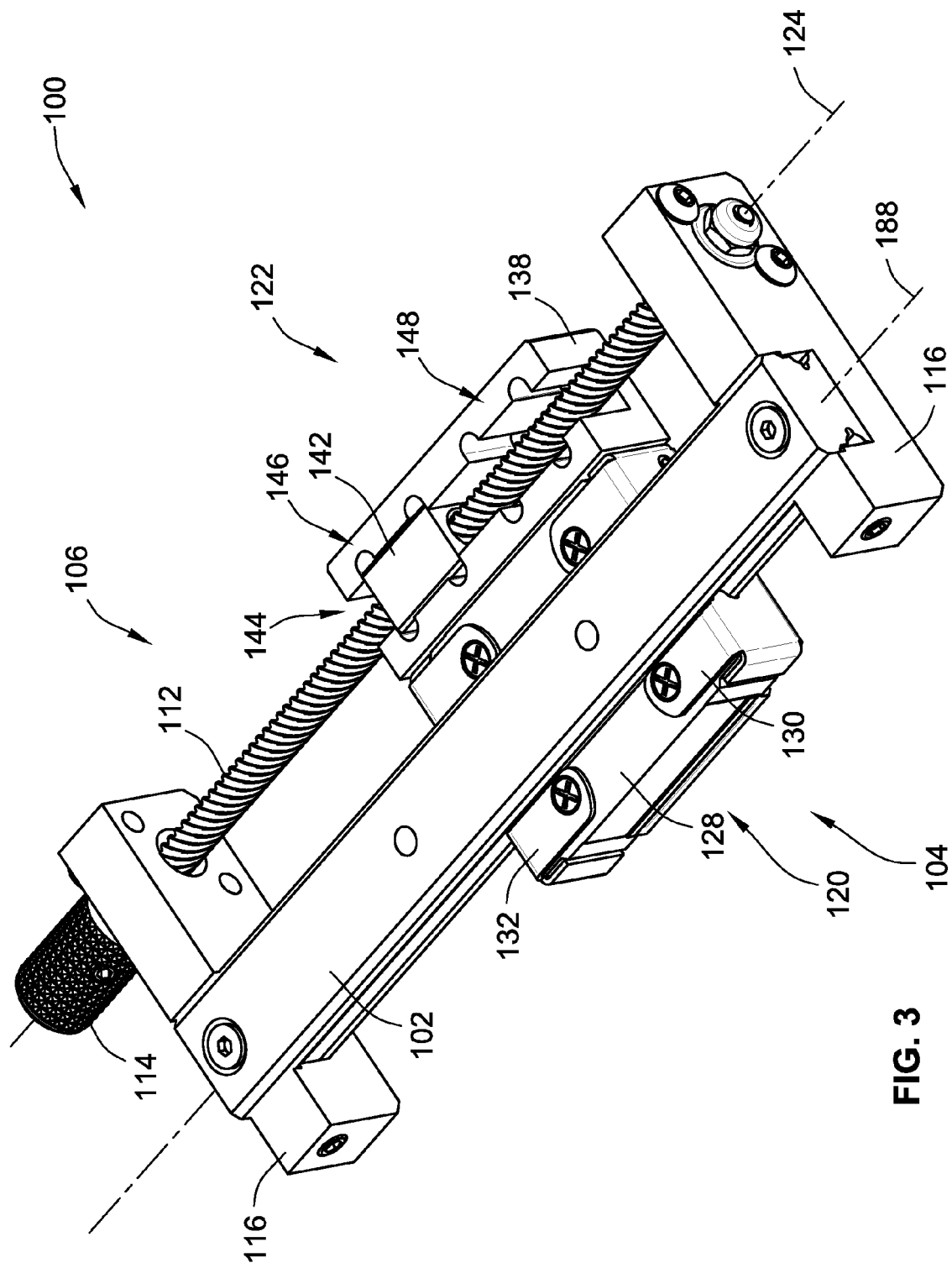
FIG. 3 is a further bottom illustration of the linear slide arrangement of FIG. 1 with a cover of the sidecar removed to show the interaction between the screw and the sidecar of the embodiment.

With references to FIGS. 3 and 4, the cover 136 has been removed from main body 138. With the bottom cover 136 removed, a square nut 142 is illustrated. The square nut 142 is carried in a nut channel 144. The nut channel 144 is sized and configured to prevent linear or rotational movement of the square nut 142 relative to the main body 138. The square nut 142 interacts with screw 112 such that rotational motion of screw 112 is converted into linear motion of the carriage arrangement 104.

Nut channel 144 includes two nut locating sections 146, 148. The nut locating sections have an enlarged width w1, w2 as compared to the standard width w3 of the nut channel 144. These enlarged or widened dimensions w1, w2 relative to width w3 allow for axially locating the square nut 142 relative to the main body 138. More particularly, the width w4 of the square nut is sized greater than width w3 of the nut channel 144. This arrangement allows for the axial ends 150, 152 of the square nut 142 to axially abut against abutment portions 154 of the main body 138. These abutment portions 154 are in the form of laterally extending walls or steps formed as a result in the difference between width w1 and w3 and width w2 and w3. These laterally extending walls or steps extend generally perpendicular to the central axis 124 of screw 112.

Sidewalls 156, 158 extending axially between ends 150, 152 of the square nut 142 engage sidewall portions 160, 162 of the main body 138 to prevent the rotation of square nut 142 within nut channel 144. As such, width w1 is substantially equal to width w4. Width w1 and width w4 may have slight variations to either form a press fit mounting of square nut within nut channel 144 or a slight but insignificant clearance between square nut 142 and nut channel 144.

Returning to FIG. 1, the linear slide arrangement 100 is configured such that the top surface 166 of main body 138 of sidecar 122 is, at most, vertically flush with top surface 168 of carriage body 126 of carriage portion 120. In other words, the top surface 166 of main body 138 is not vertically above the top surface 118 of the guide rail 102 a further distance than the top surface 168 of carriage body 126. This arrangement allows for replacing a standard guide unit that only has a carriage and a guide rail with a linear slide arrangement 100 without affecting the location of any attached device relative to the top surface 118 of the guide rail 102.

Figure 6:
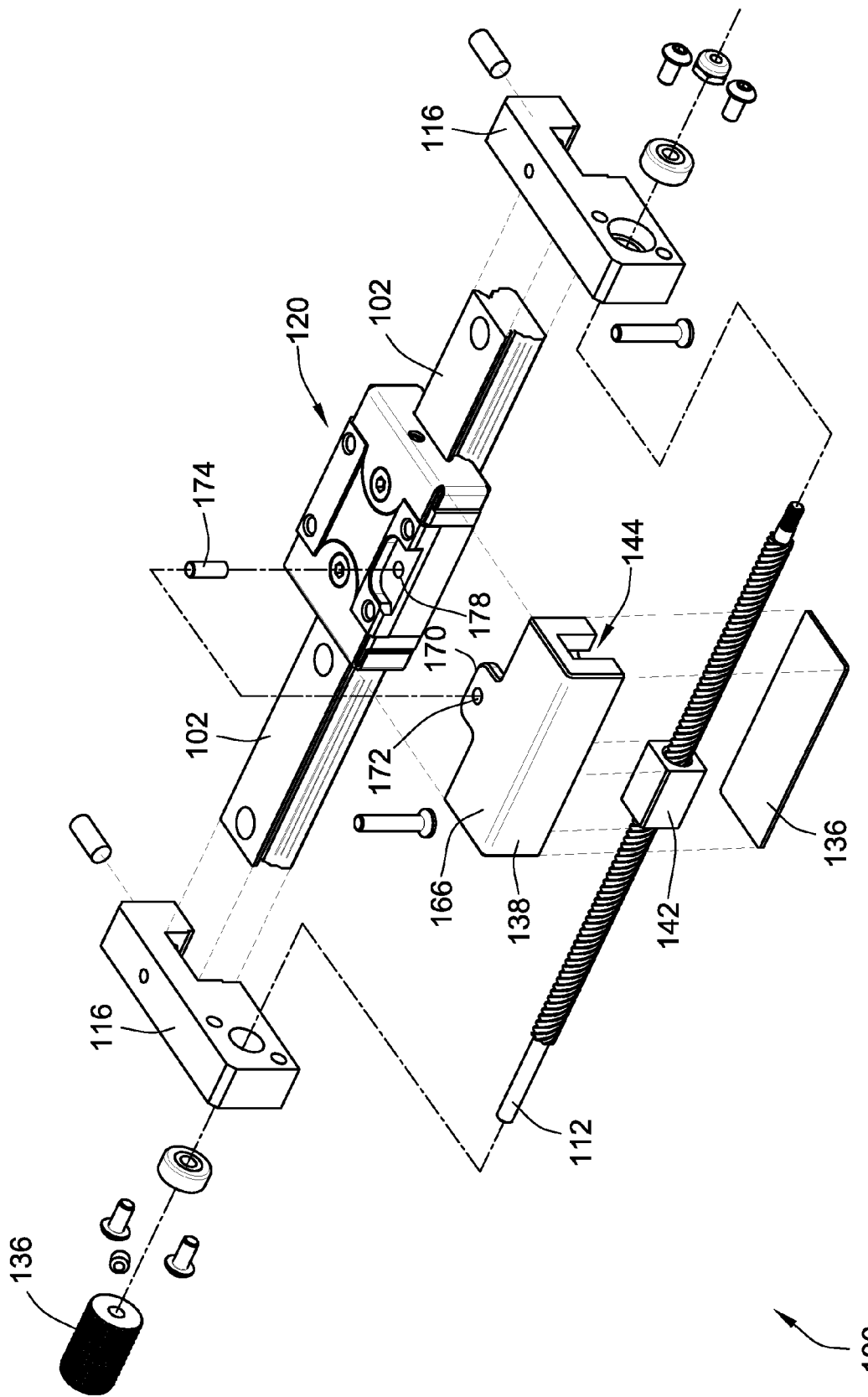
FIG. 6 is a top exploded view illustration of the linear slide arrangement of FIG. 1.

With reference to FIG. 6, to affix the sidecar 122 in the offset or cantilevered arrangement of the illustrated embodiment, the main body 138 includes a laterally extending attachment portion 170. The attachment portion 170 includes a mounting aperture 172 that extends entirely through the depth of the laterally extending attachment portion 170. The mounting aperture 172 receives an attachment fastener. The attachment fastener in the illustrated embodiment is a press fit pin 174 that is pressed into the mounting aperture 172 and a corresponding mounting aperture 178 of the carriage body 126. The pin 174 may be in the form of a roll pin such that it is slightly resiliently biased or compressed when pressed into the pair of mounting apertures 172, 178 to have a tight fit engagement. However, other attachment mechanisms such as screws, rivets, or other devices can be used. Preferably, the attachment fastener is recessed below the top surface 166 of the main body 138.

Figure 7:
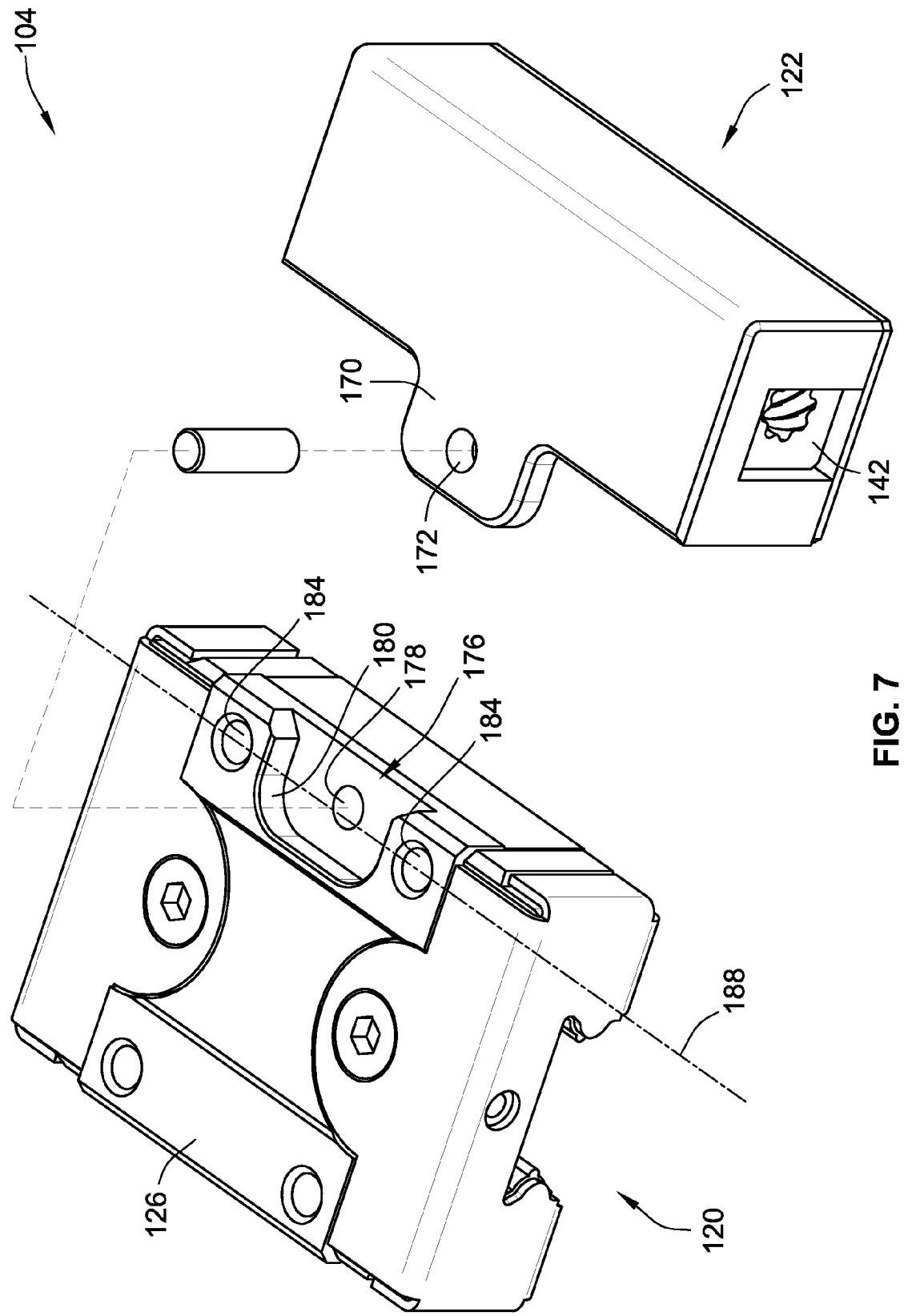
FIG. 7 is a partial exploded view illustration of the carriage arrangement of FIG. 1.

With reference to FIGS. 1 and 7, mounting apertures 172, 178 are axially interposed between object attachment apertures 184 when the sidecar 122 is attached to the carriage body 126. Further, the mounting apertures 172, 178 and object attachment apertures 184 are substantially axially aligned with one another, see axis 186. Axis 186 is generally parallel to axis 188 of guide rail 102 and axis 124 of screw 112.

The main body 138 of sidecar 122 is preferably formed from either machined metal or injection molded plastic. The bottom cover 136 is preferably formed from machined or stamped metal or injection molded plastic.

Figure 5:
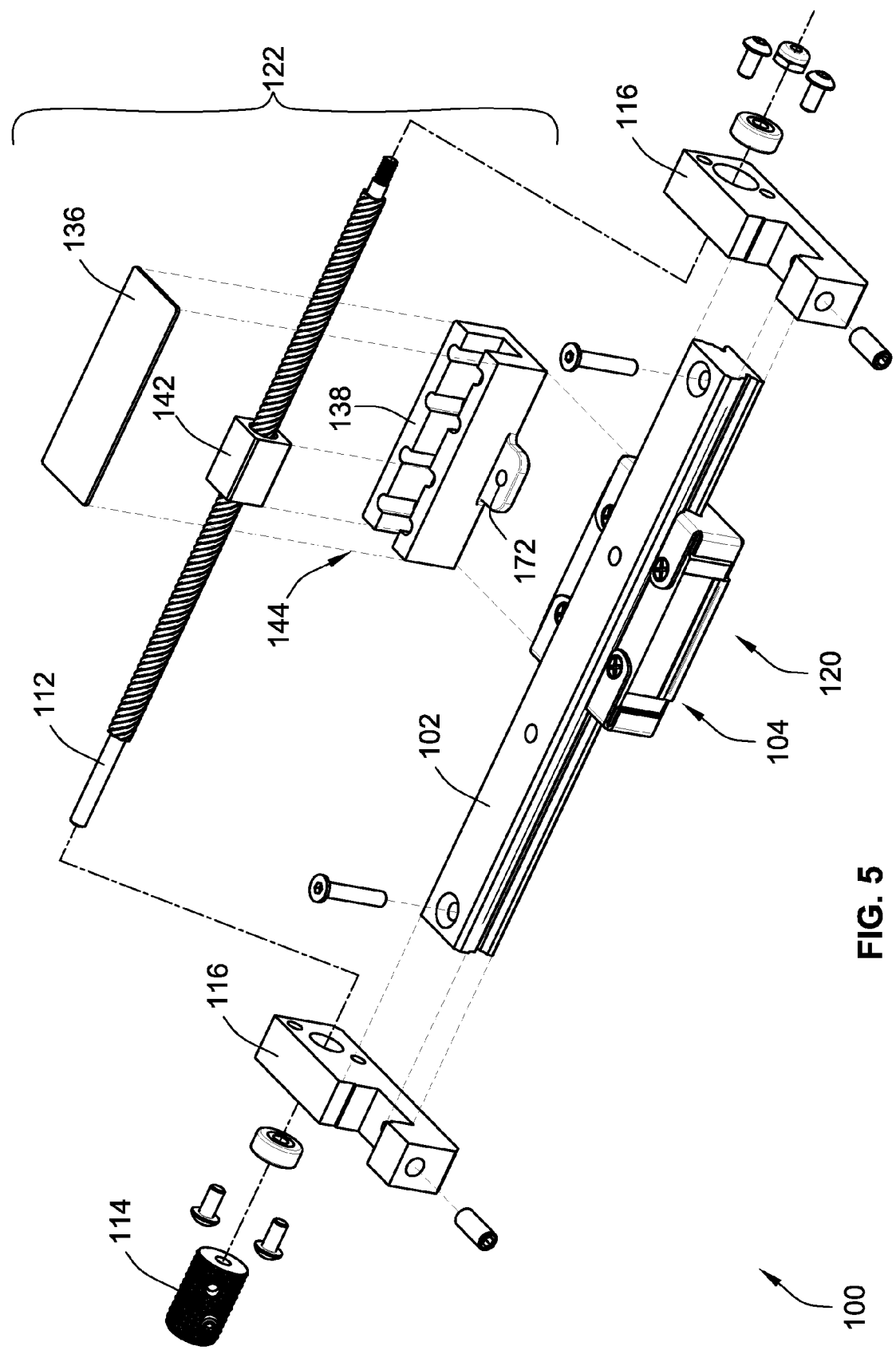
FIG. 5 is an exploded bottom view illustration of the linear slide arrangement of FIG. 1.

FIG. 5 is a bottom exploded illustration of the linear slide arrangement 100 of FIG. 1. FIG. 6 is a top view exploded version of the linear slide arrangement 100 of FIG. 1.

Figure 8:
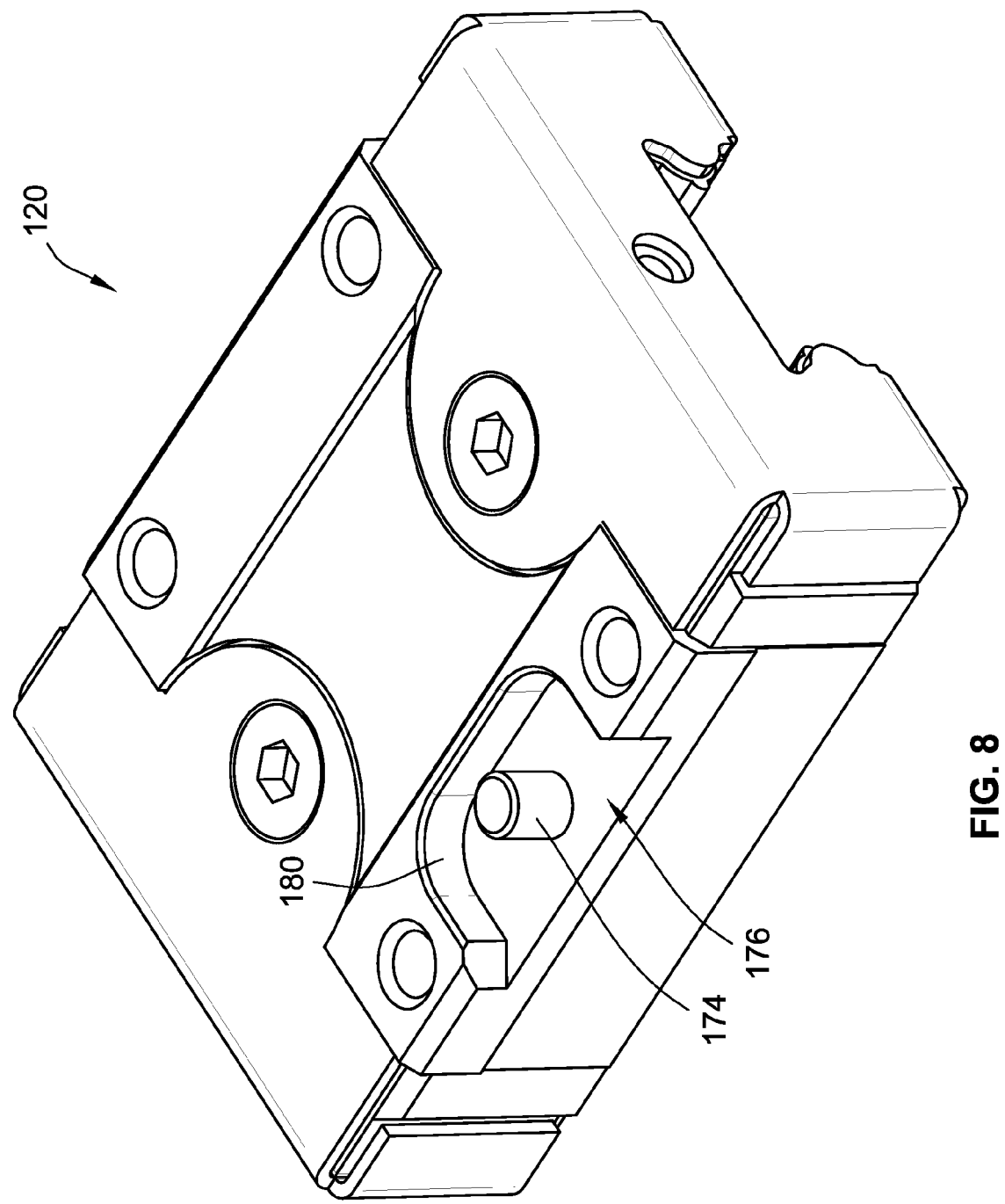
FIG. 8 is a top perspective illustration of a carriage of the linear slide arrangement of FIG. 1.
Figure 9:
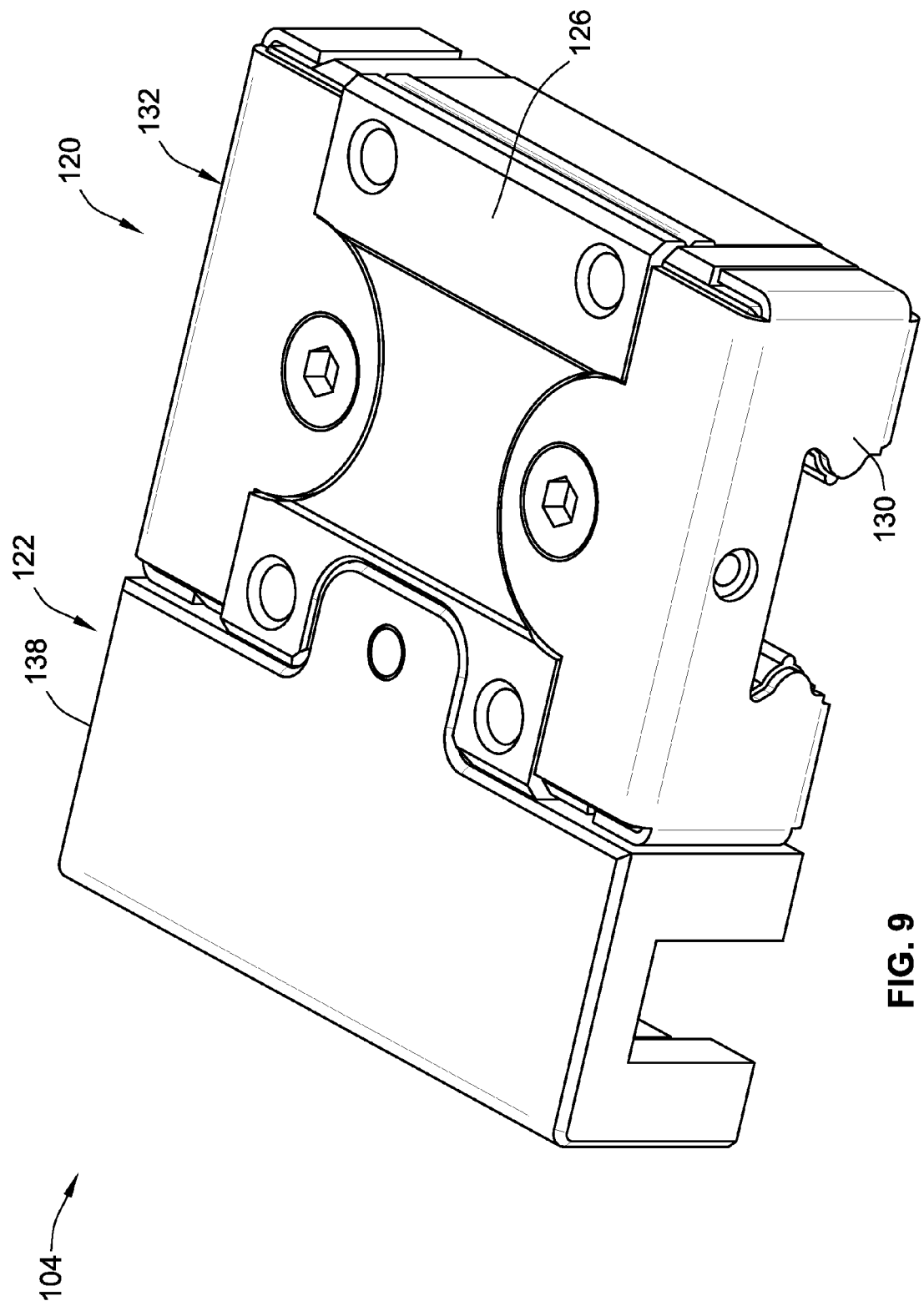
FIG. 9 is a top illustration of the carriage arrangement of the linear slide arrangement of FIG. 1.

FIGS. 7 and 8 illustrate components of the carriage arrangement 104. With reference to these figures, it is illustrated that the carriage body 126 includes a mounting cavity 176. The mounting cavity 176 is sized and shaped to receive and mate with the attachment portion 170 of the main body 138. In FIG. 7, the mounting aperture 178 of the carriage body 126 is illustrated. The mounting cavity 176 is formed by a generally c-shaped sidewall 180 that is typically machined into carriage body 126. The three sides of the mounting cavity 176 formed by sidewall 180 are used to engage corresponding sides of attachment portion 170. Preferably, the mounting cavity 176 and attachment portion 170 are closely sized and shaped to prevent any slop therebetween so as to precisely locate the sidecar 122 relative to carriage portion 120.

While illustrated as separate components, carriage body 126 and main body 138 could be formed as a single continuous component. In such an embodiment, the carriage body would extend laterally outward beyond plastic ball guides 128 in a cantilevered fashion. This cantilevered portion would typically be a thin portion, such as, like current bottom cover 136. A second portion, much like current main body 138 would then attach to an underside thereof.

Figure 10:
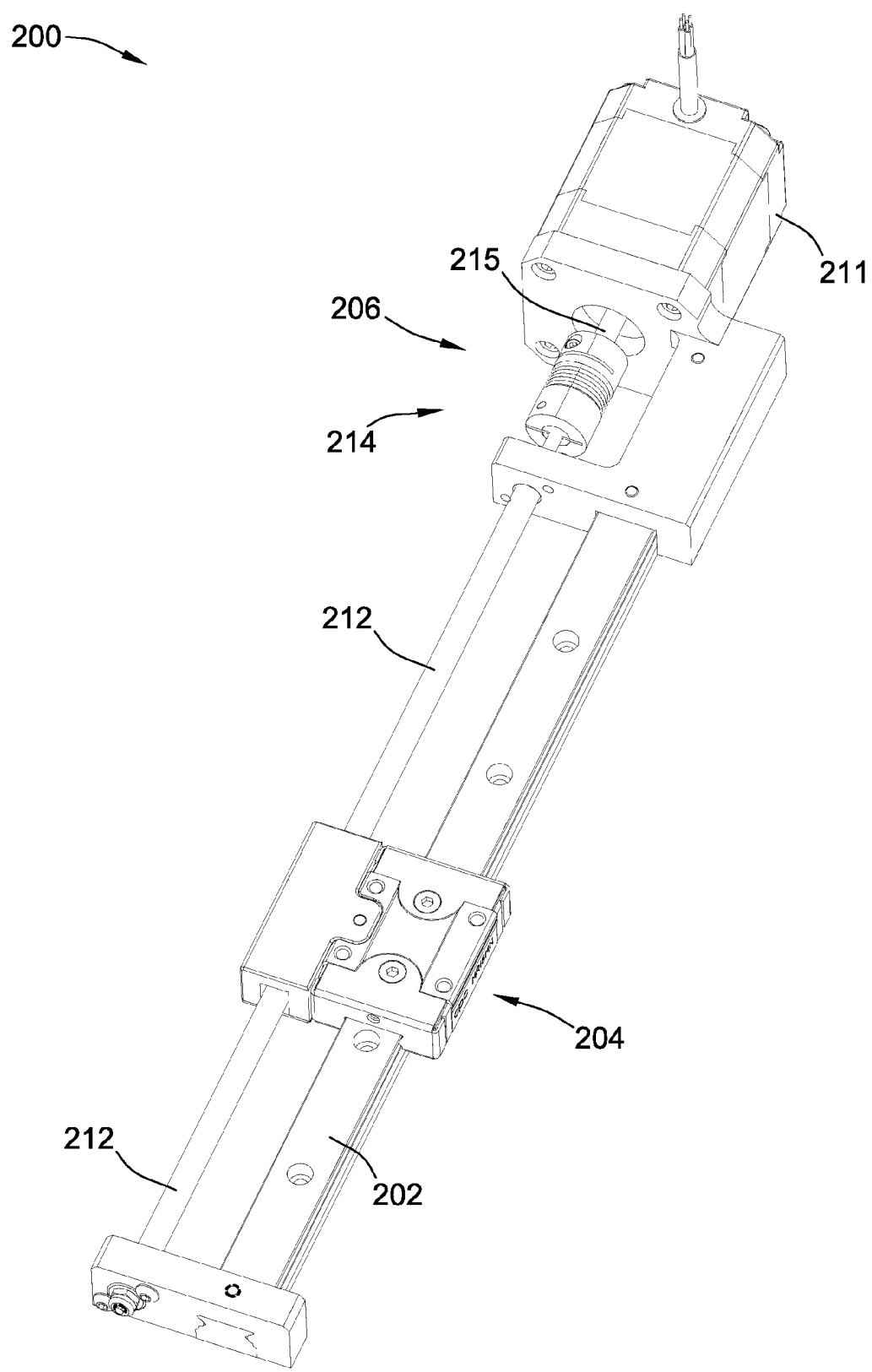
FIG. 10 is an alternative exemplary embodiment of a further linear slide arrangement according to the teachings of the present invention.

With reference to FIG. 10, an alternative embodiment of a linear slide arrangement 200 is illustrated. The linear slide arrangement 200 operates substantially the same as the prior embodiment. Therefore, only those differences that are relevant will be discussed.

The linear slide arrangement 200 of this embodiment is an automatically driven device. More particularly, the drive mechanism 206 includes an electric motor 211 operably coupled to screw 212. An anti-backlash coupling 214 couples a drive shaft 215 of the motor 211 to the screw 212. The motor 211 receives electrical signals to selectively control rotation of screw 212 to adjust the position of carriage arrangement 204 along the guide rail 202.

Figure 11:
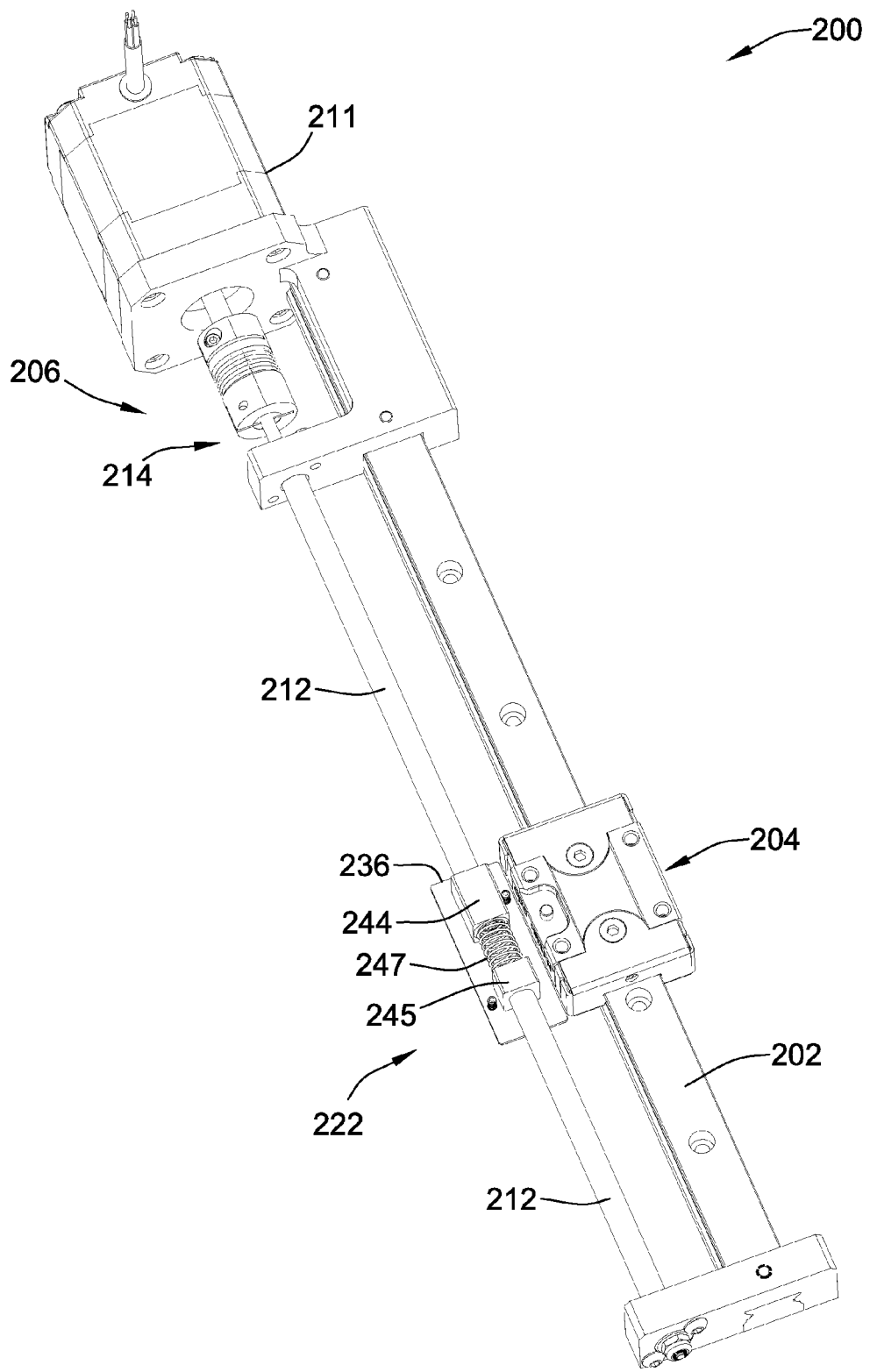
FIG. 11 is a further top illustration of the linear slide arrangement of FIG. 10 having a portion of the sidecar removed to illustrate the internal components thereof.
Figure 12:
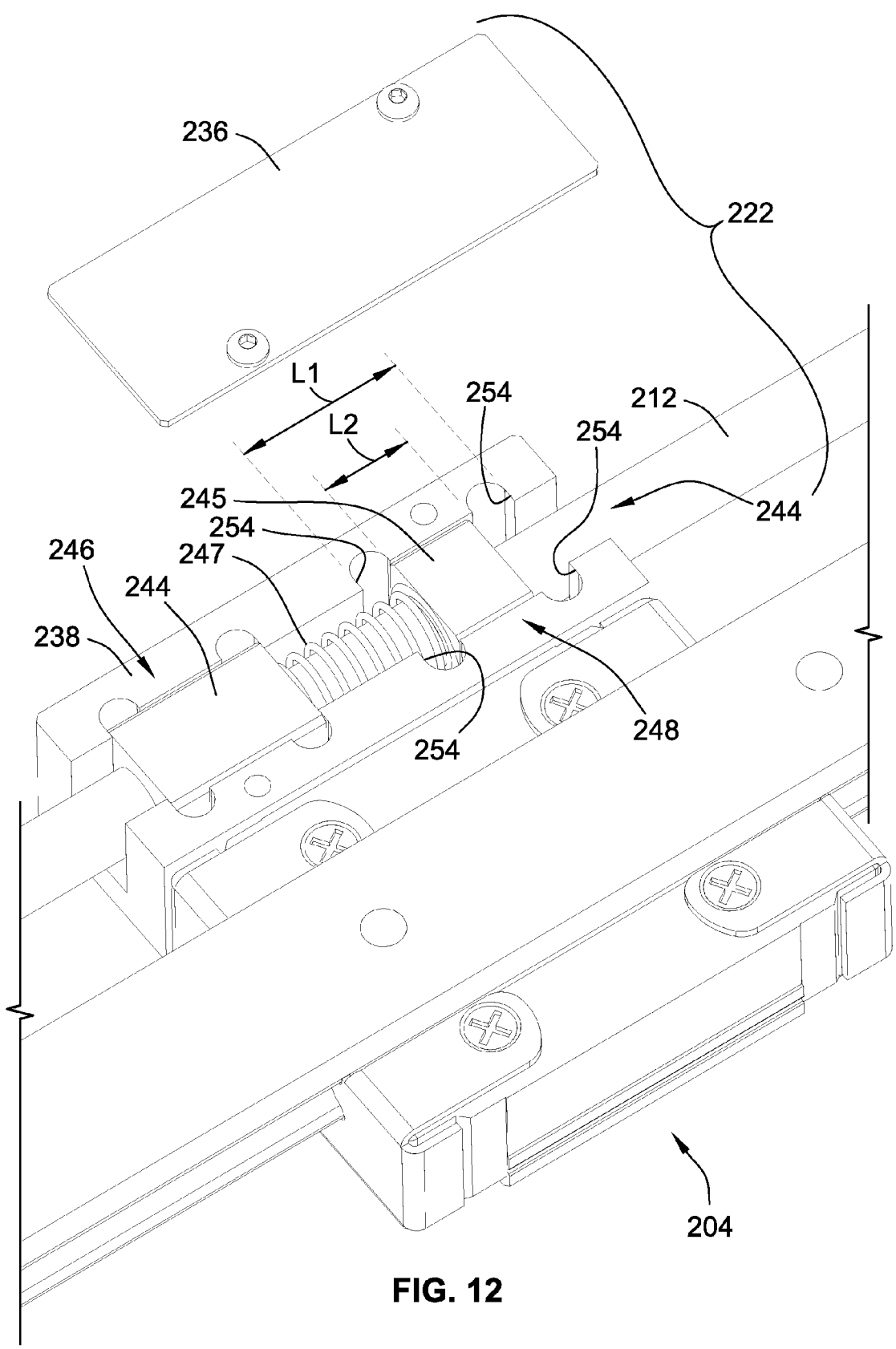
FIG. 12 is an enlarged partial illustration of the linear slide arrangement of FIG. 10 from a bottom perspective.

A further difference between this embodiment and the prior embodiment is illustrated in FIGS. 11 and 12. This embodiment includes an anti-backlash feature between screw 212 and sidecar 222. The anti-backlash feature is incorporated into sidecar 222 to prevent backlash and slop between the sidecar 222 and screw 212.

With primary reference to FIG. 12, the sidecar 222 includes a substantially similar main body 238 that is covered by a bottom cover 236 in substantially the same manner as the prior embodiment. Again, the main body 238 defines a nut channel 244 through which the screw 212 extends and in which a square nut 244 is affixed such that it cannot move relative to main body 238.

However, sidecar 222 includes an anti-backlash square nut 245 that is axially spaced apart from and biased away from square nut 244 by biasing spring 247. The combination of the anti-backlash square nut 245 and square nut 244 being biased apart from one another by biasing spring 247 ensures that the threads of the square nut 244, 245 are biased away from one another and into the threads of screw 212.

The nut channel 244 again includes nut locating sections 246, 248. Nut locating section 246 and square nut 244 cooperate with one another substantially similar as discussed previously. However, the anti-backlash square nut 245 is prevented from rotating within nut locating section 248 but is not prevented from axially sliding within nut locating section 248 like square nut 244 within nut locating section 146. The axial length L1 between facing abutment portions 254 of the nut locating section 248 is greater than the axial length L2 from opposed ends of the anti-backlash square nut 245. This shorter length L2 of the anti-backlash square nut 245 allows for axial translation of the anti-backlash square nut 245 relative to main body 238 within the nut locating section 248. As such, the axial relative position of the two square nuts 244, 245 adjusts during extended operation via biasing provided by biasing spring 247. Again, this arrangement provides constant loading of the two square nuts 244, 245 against the threads of screw 212 to prevent backlash.

The width of the anti-backlash square nut 245 is substantially equal to the width of square nut 244. As such the two square nuts 244, 245 have substantially identical cross sections but merely have different axial lengths.

Figure 13:
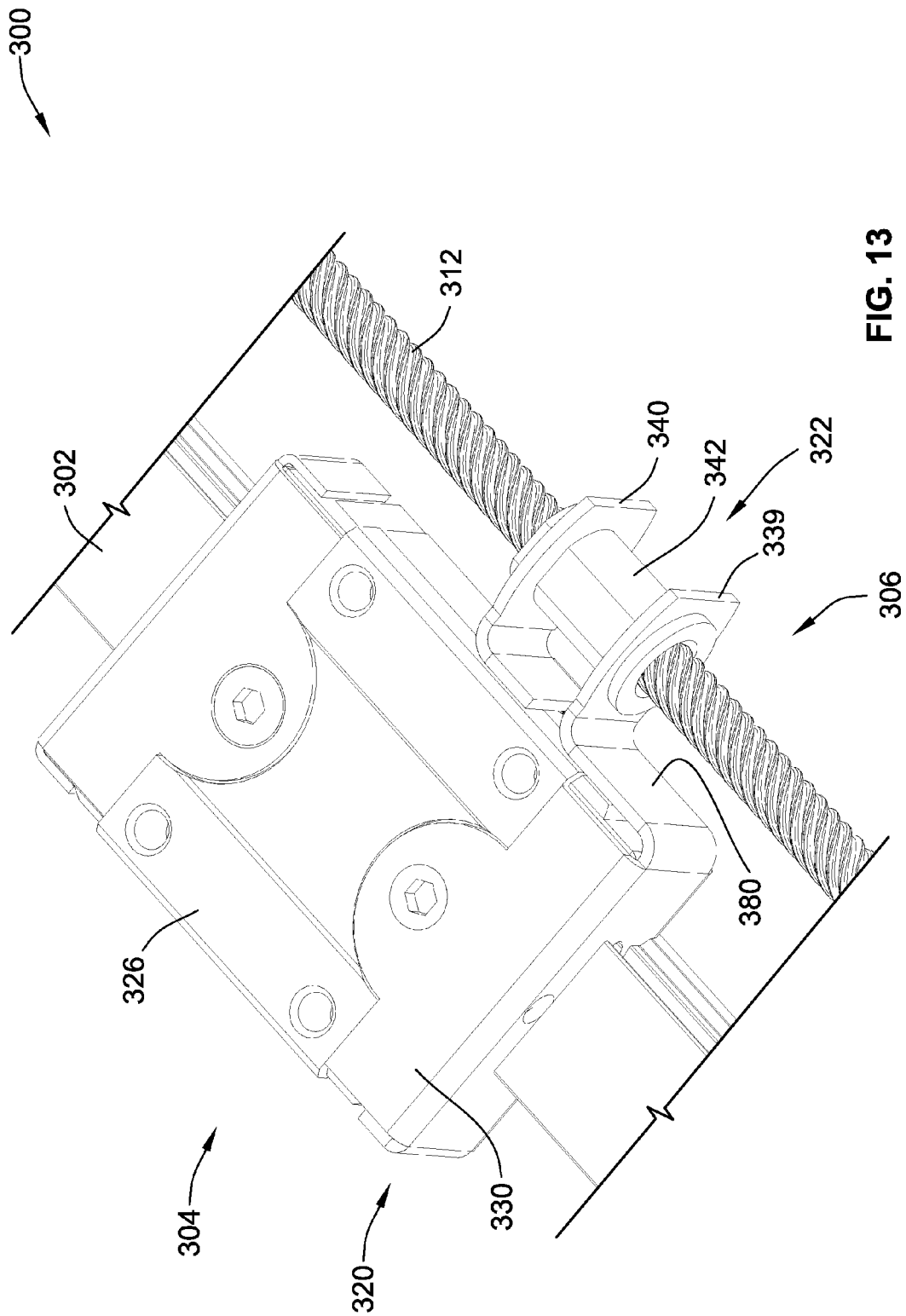
FIG. 13 is a top perspective illustration of a further exemplary embodiment of a linear slide arrangement according to the teachings of the present invention.
Figure 14:
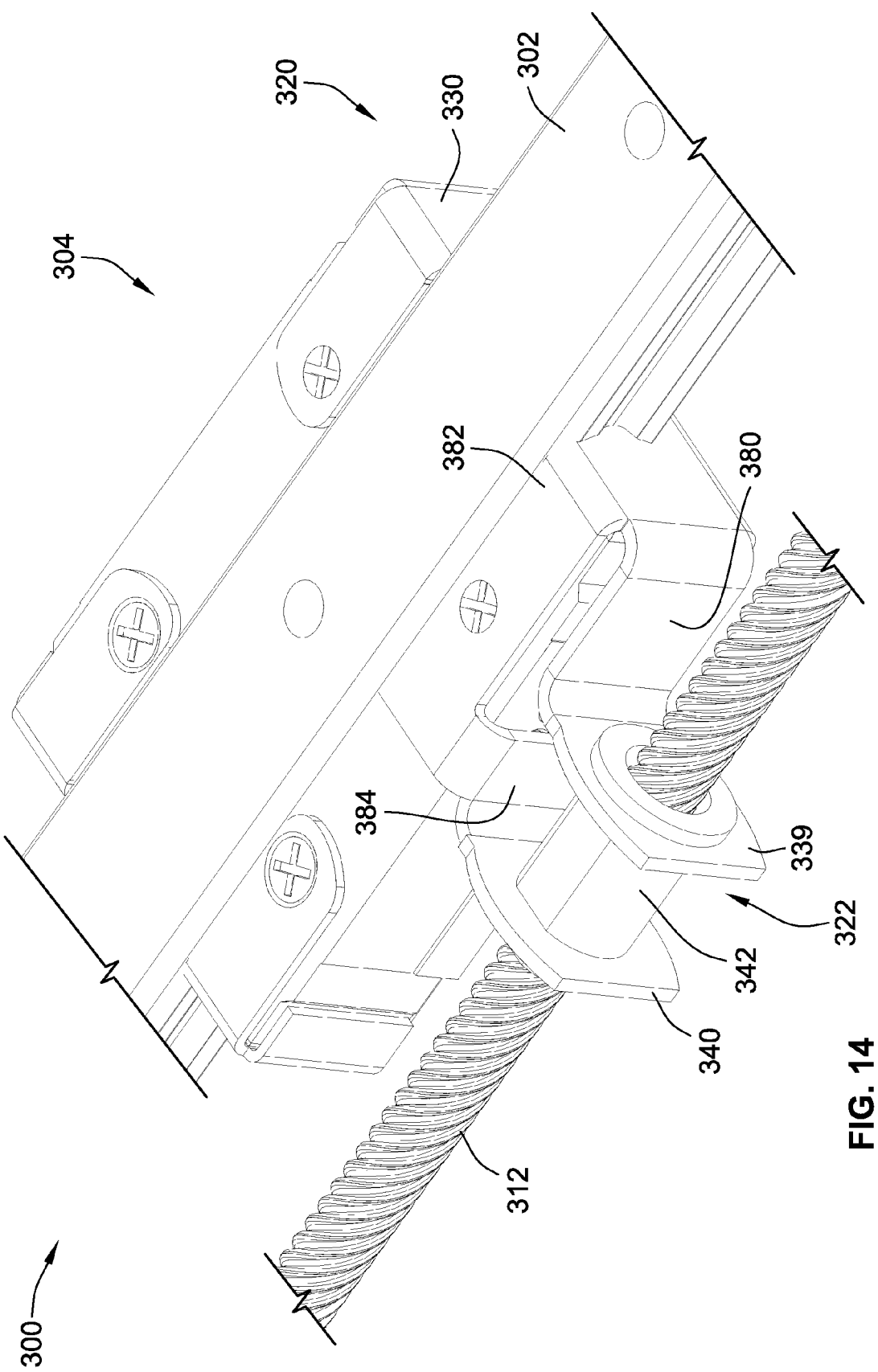
FIG. 14 is an enlarged partial illustration of the linear slide arrangement of FIG. 13.

FIGS. 13 and 14 illustrate a further exemplary embodiment of a linear slide arrangement 300. The linear slide arrangement 300 operates in substantially the same manner as the prior linear slide arrangement 100. Therefore, the primary differences between this linear slide arrangement 300 and the prior linear slide arrangement 100 will be discussed.

The linear slide arrangement 300 generally includes a guide rail 302 to which is attached a carriage arrangement 304 which is driven along the guide rail 302 by a drive mechanism 306.

In this arrangement, the sidecar 322 is provided, in part, by one of the end caps 330 of carriage 320. As such, the sidecar 322 is not formed by a separate sidecar that is attached to the carriage body 326 of carriage 320.

In this embodiment, the end cap 330 includes a pair of laterally outward extending flanges 339, 340. The flanges 339, 340 are axially spaced apart from one another. A nut 342 is affixed to the flanges 339, 340. The nut 342 is affixed to flanges 339, 340 in such a manner that nut 342 does not move axially or angularly relative to flanges 339, 340.

This carriage arrangement 304 can be formed from the prior carriages by merely replacing the end cap of the prior carriages with the disclosed end cap 330.

End cap 330 is substantially similar to end cap 130. With additional reference to FIGS. 14 and 15, it is illustrated that flange 339 is integrally formed with side flange 380 and flange 340 is integrally formed with bottom flange 382. Both side flange 380 and bottom flange 382 were already components of the prior carriages. More particularly, with reference to FIG. 1 and FIG. 4, the carriage portion 120 includes side flange 180 and bottom flange 182 for securing end cap 130 to the carriage portion 120.

Returning to FIGS. 14 and 15, the side flange 380 and bottom flange 382 are axially elongated as compared to the end caps of the prior embodiments. Flange 339 directly extends laterally outward from side flange 380. The flange 340 extends from an upward extending flange portion 384 that is directly connected to bottom flange 382. The upward extending flange 384 is thus mechanically between the flange 340 and bottom flange 382.

Figure 15:
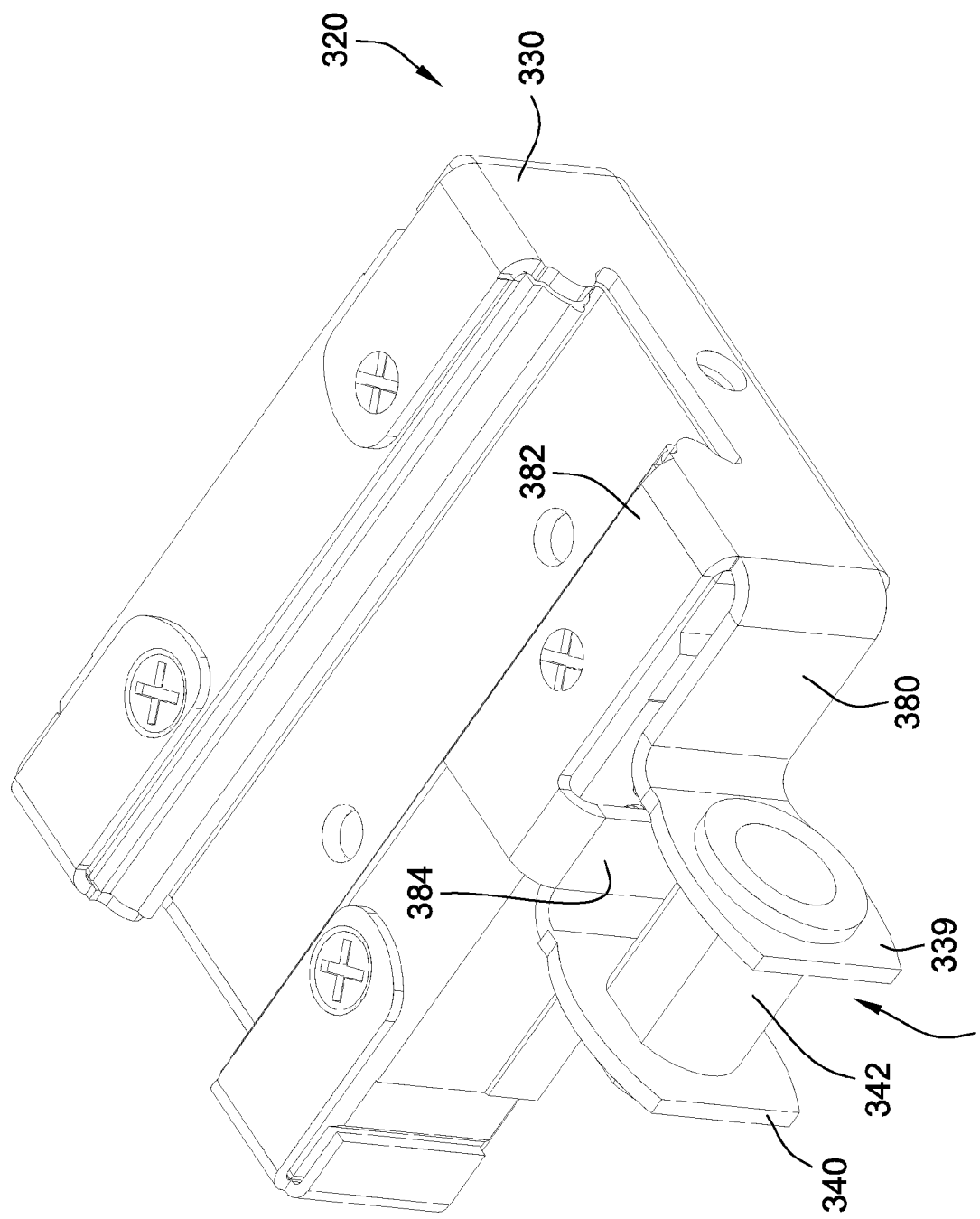
FIG. 15 is a top illustration of the carriage arrangement of the linear slide arrangement of FIG. 13.

The embodiment of FIGS. 13-15 is an economical design that does not substantially increase the part numbers for the linear slide arrangement. Further, it is a design that allows for modification of an existing carriage, such as carriage portion 120, into a linear slide according to the various embodiments of the present invention.

Therefore, one method according to an embodiment of the present invention includes the method of converting a standard carriage into a carriage for use in a linear slide arrangement. The method includes the removal of an end cap that does not include a nut/sidecar portion and replacing that end cap with an end cap that integrally includes a nut/sidecar arrangement.

It should be noted, that in a preferred implementation of the embodiment of FIGS. 13-15, the flanges 339, 340 are formed as one piece components with the rest of the end cap 330. More particularly, this means that the end cap is formed from a single piece of material. Even more particularly, the end cap 330 is a continuous single piece of material. Therefore, the end cap 330 is formed from one piece of material and is not formed from a plurality of pieces of material that are subsequently connected together such as by mechanical fasteners or welding. In this preferred embodiment, the end cap 330 is formed from a continuous piece of material such as by stamping or cutting, or injection molded as a single continuous piece of material.

The end cap 330, as illustrated in FIGS. 14 and 15, wraps around both an axial end of the carriage 320 as well as lateral sides of the carriage 320.

With reference to FIG. 13, the top of the sidecar 322 is again configured such that it is vertically no higher than the top surface of the carriage body 326.

The nut 342 is preferably formed from a plastic material that has low friction characteristics. Further, the plastic material may be lubricious such that it is considered to be self lubricating. Further, the nut 342 could be formed from other materials such as metal. The characteristics of nut 342 also apply to the previous square nuts discussed in the prior embodiments.

Figure 16:
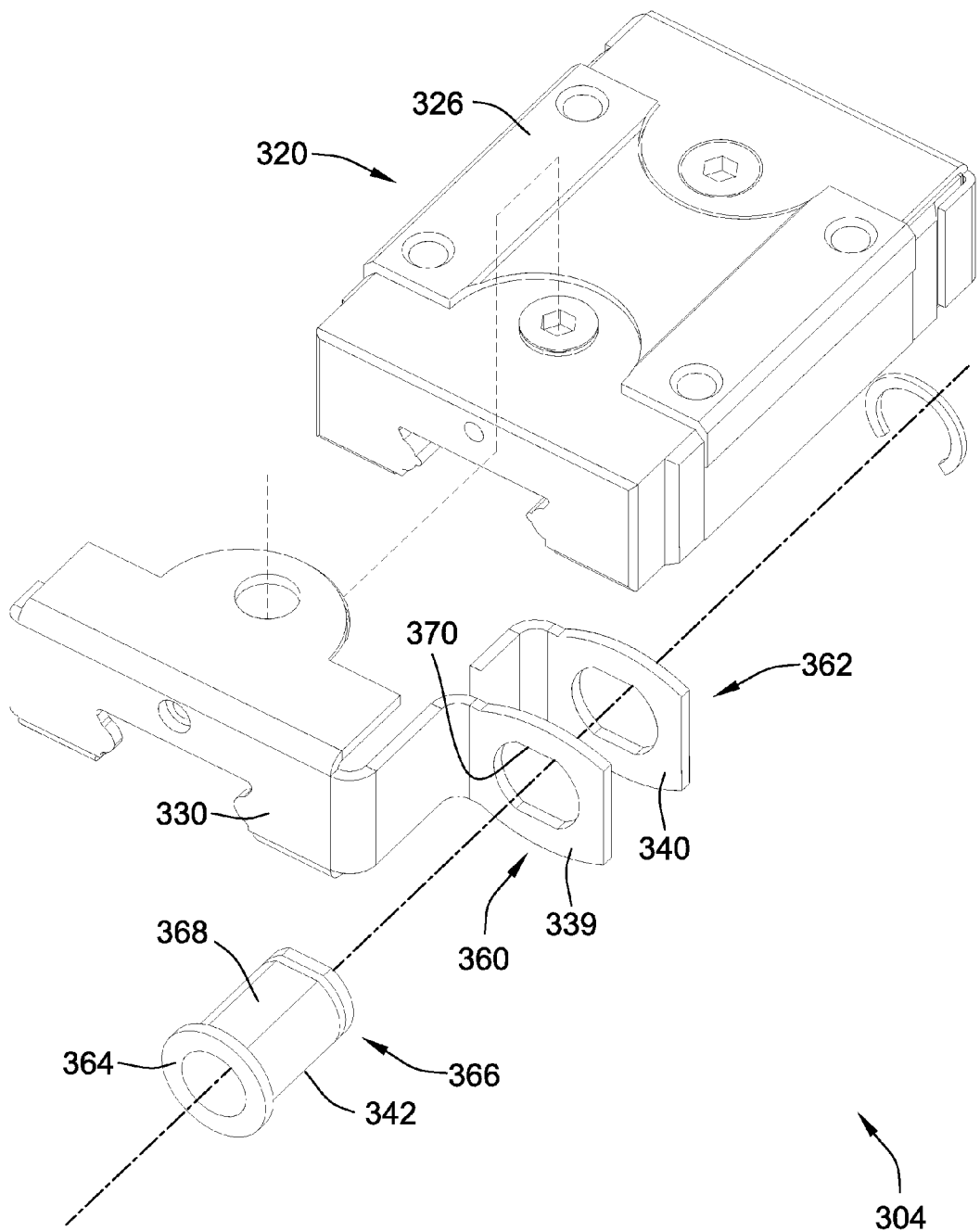
FIG. 16 is a top exploded illustration of the carriage arrangement of the linear slide arrangement of FIG. 13.

The flanges 339, 340 in the illustrated embodiment include apertures 360, 362 through which the nut 342 is pressed fit to mount nut 342 to end cap 330. With reference to FIG. 16, the nut 342 includes radially outward extending abutment flange 364 and attachment channel 366. The abutment flange 364 will axially press against an outer surface of flange 339 while a snap ring or flange 340 will be received into mounting channel 366 of nut 342. This arrangement will easily axially fix the position of nut 342 relative to flanges 339, 340. The nut 342 may include one or more flat surfaces 368 that engage a corresponding flat surface 370 of one of apertures 360, 362 to prevent rotation of the nut 342 relative to flanges 339, 340. This anti-rotation feature allows the rotational motion of screw 312 to be converted to linear motion of the carriage arrangement 304.

Figure 17:
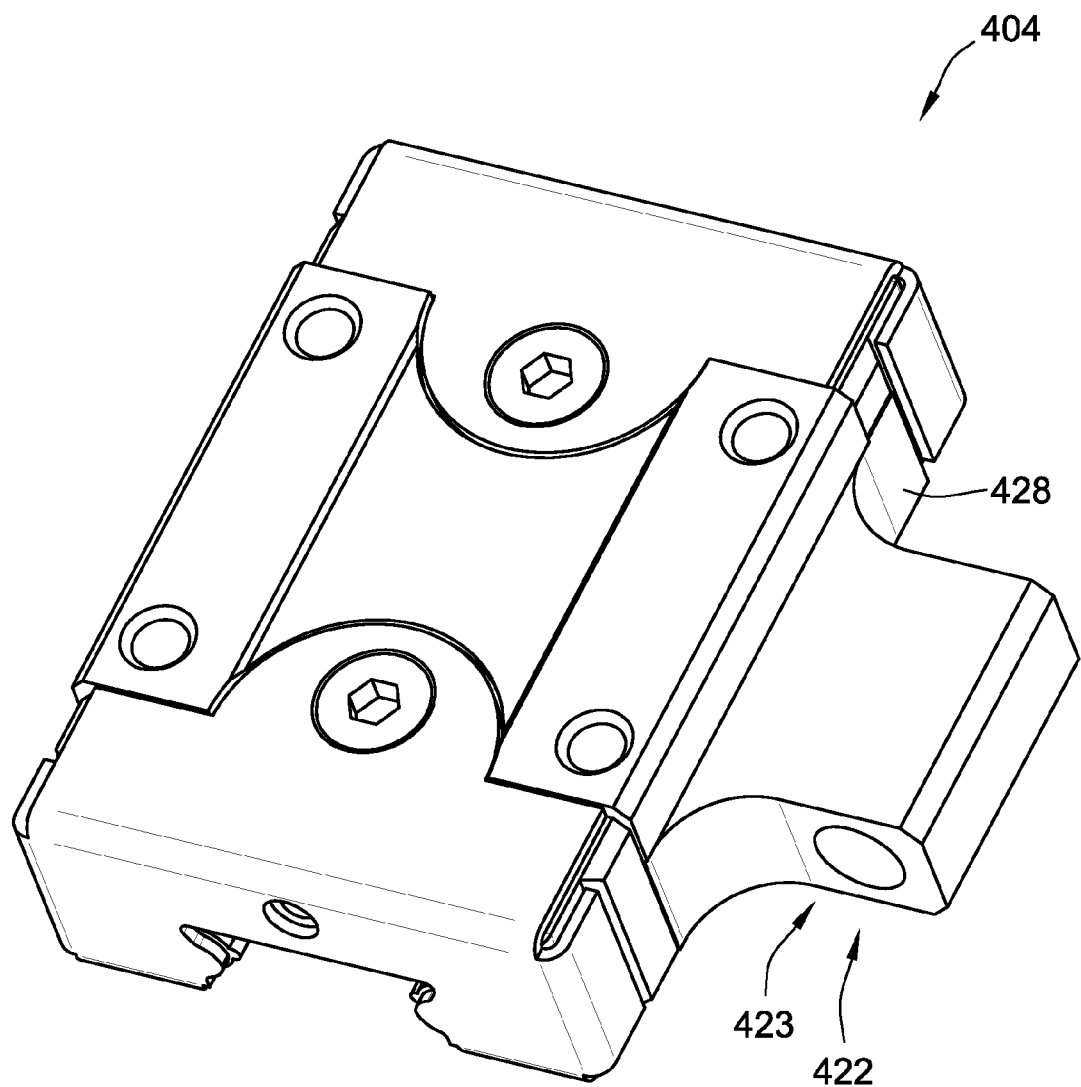
FIGS. 17-19 illustrate a further embodiment of a carriage arrangement.
Figure 18:
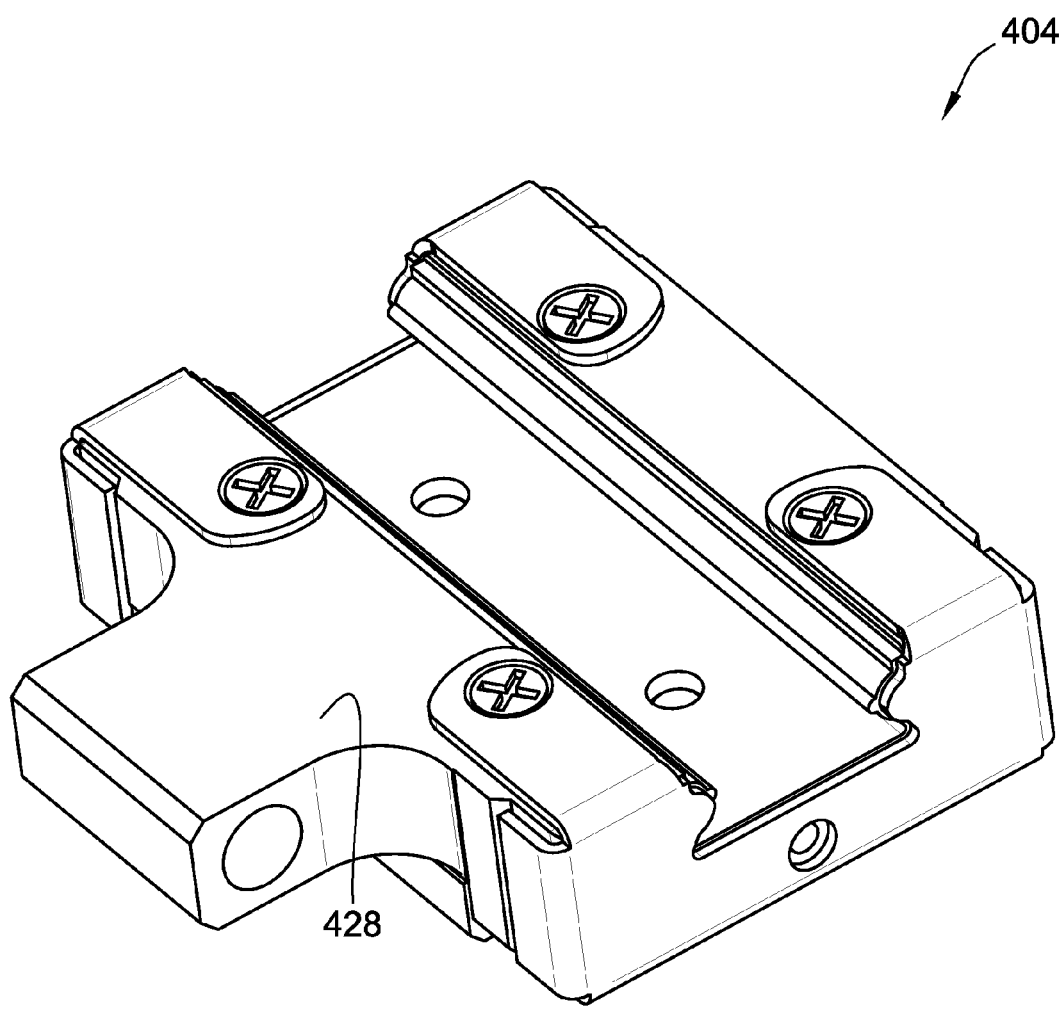
Figure 19:
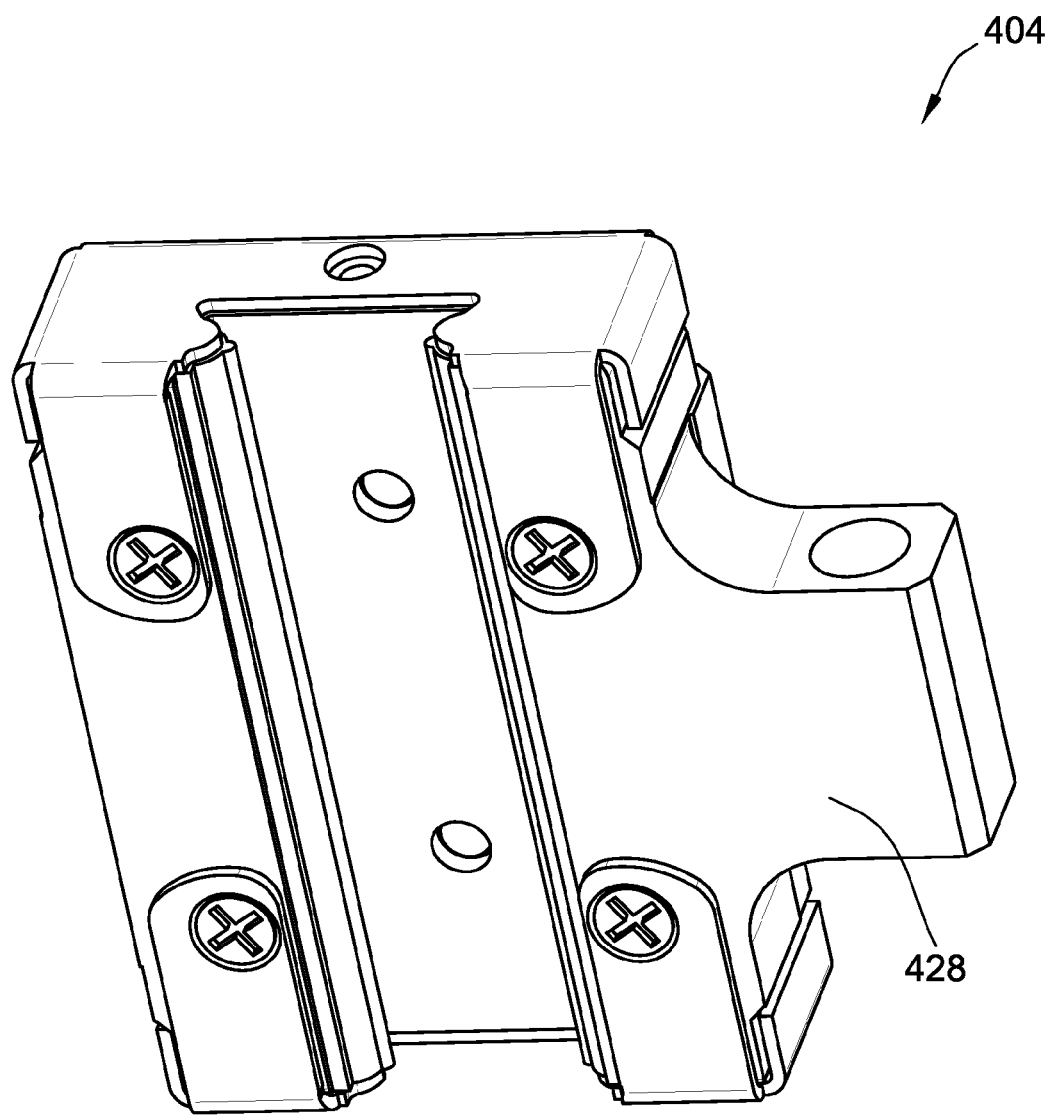

FIGS. 17-19 illustrate a further embodiment of a carriage arrangement 404. This carriage arrangement includes a sidecar portion 422 that is integrally molded into a single piece with the plastic ball guide 428. The sidecar portion includes an aperture 423 that can be internally threaded which would mate with a screw or could house a separate nut that is inserted therein.

Figure 20:
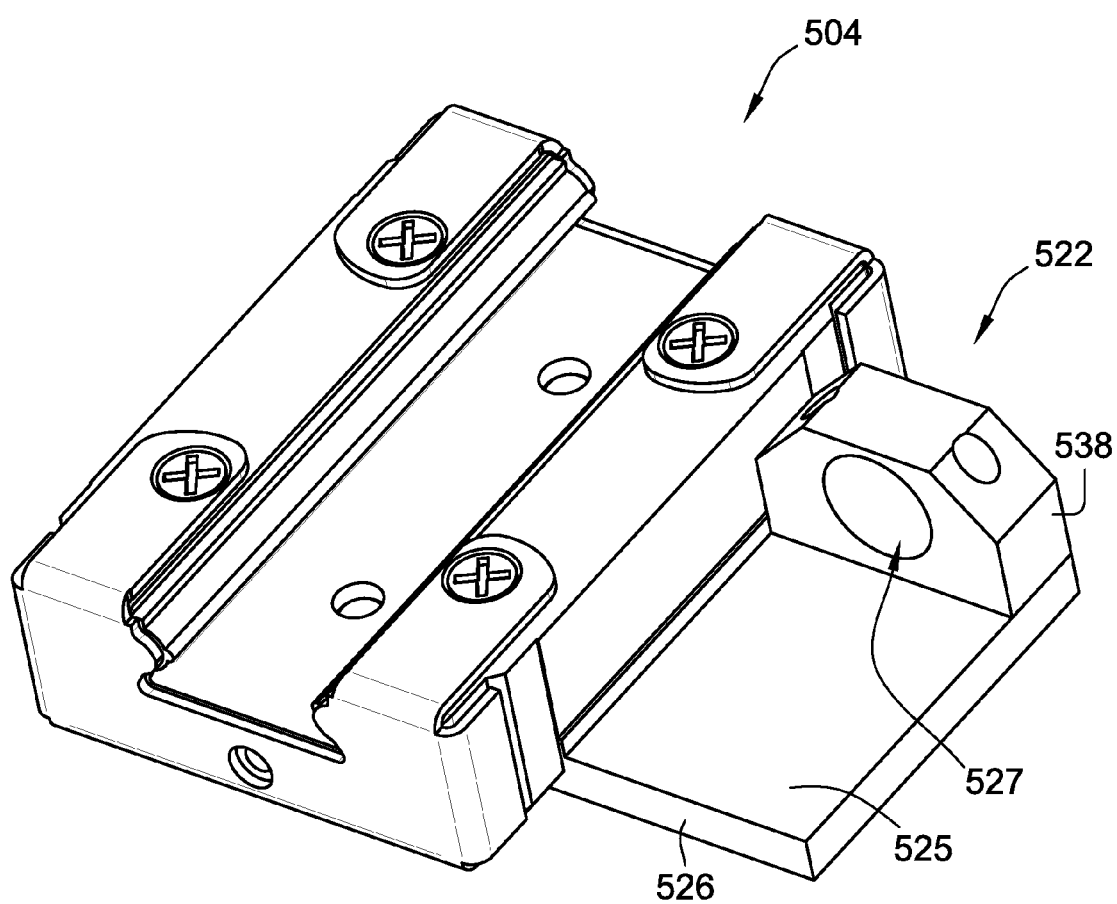
FIGS. 20 and 21 illustrate a further embodiment of a carriage arrangement.
Figure 21:
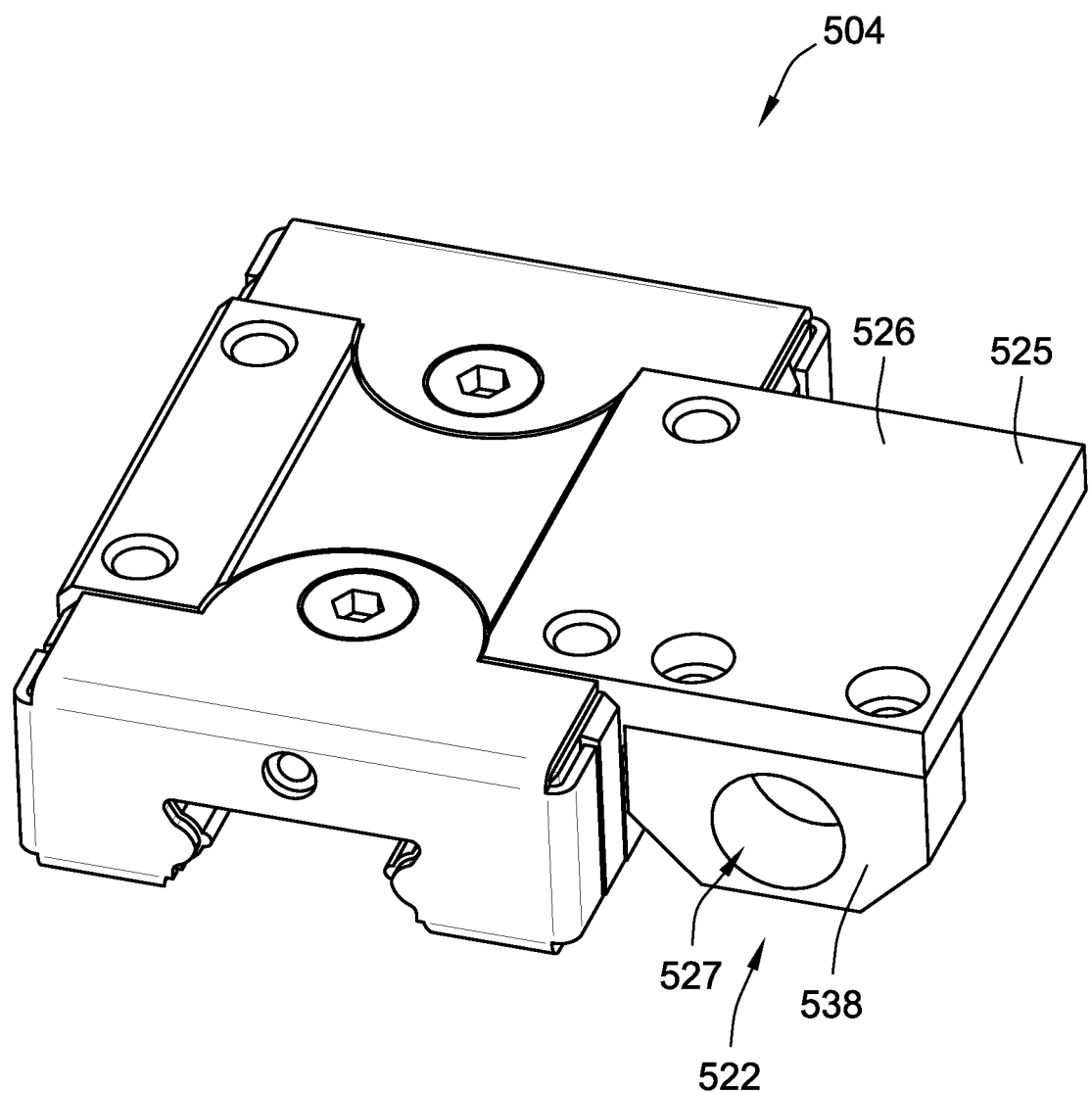
Figure 22:
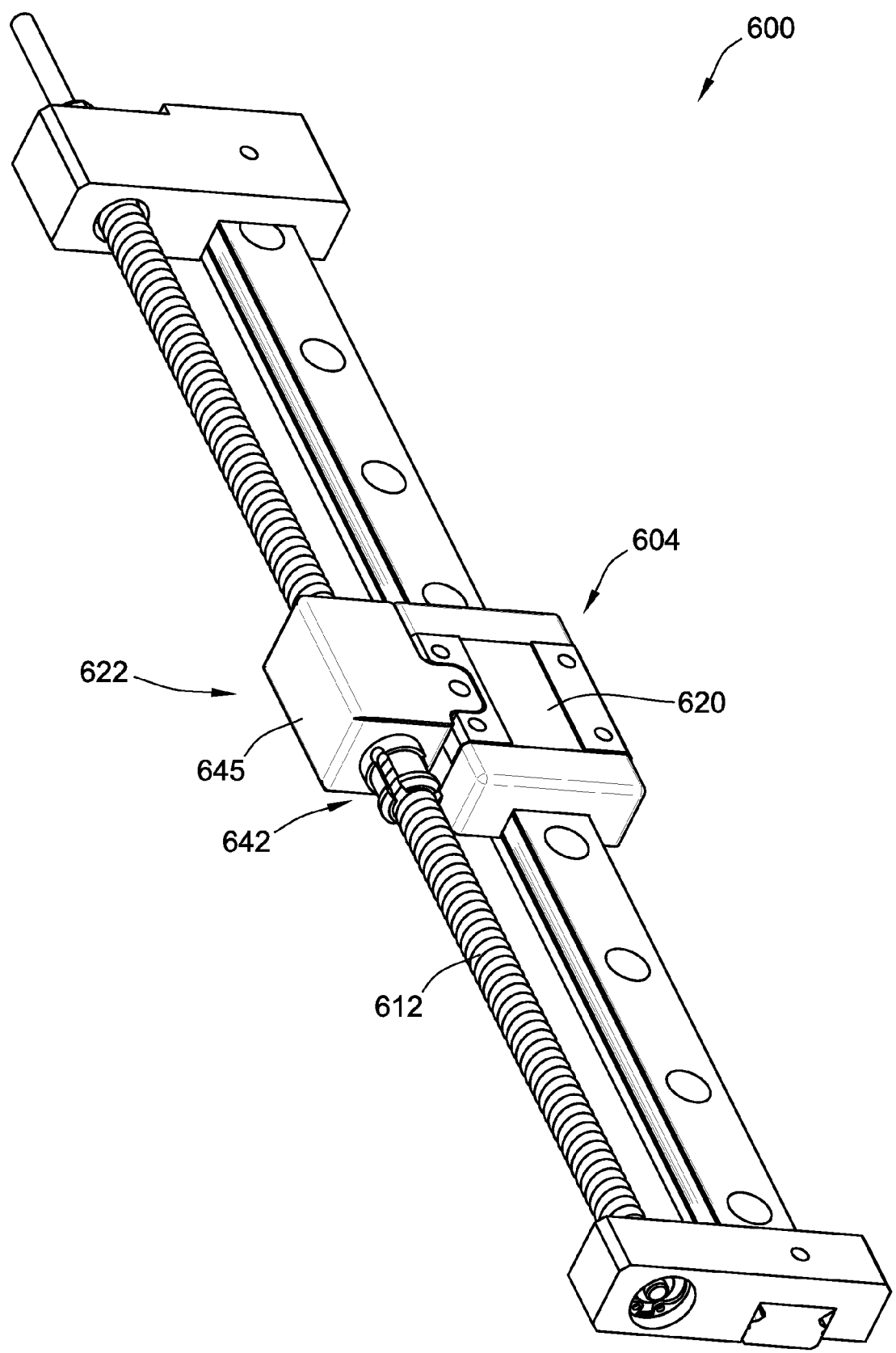
FIGS. 22-26 illustrate a further embodiment of a linear arrangement according to the present invention.
Figure 23:
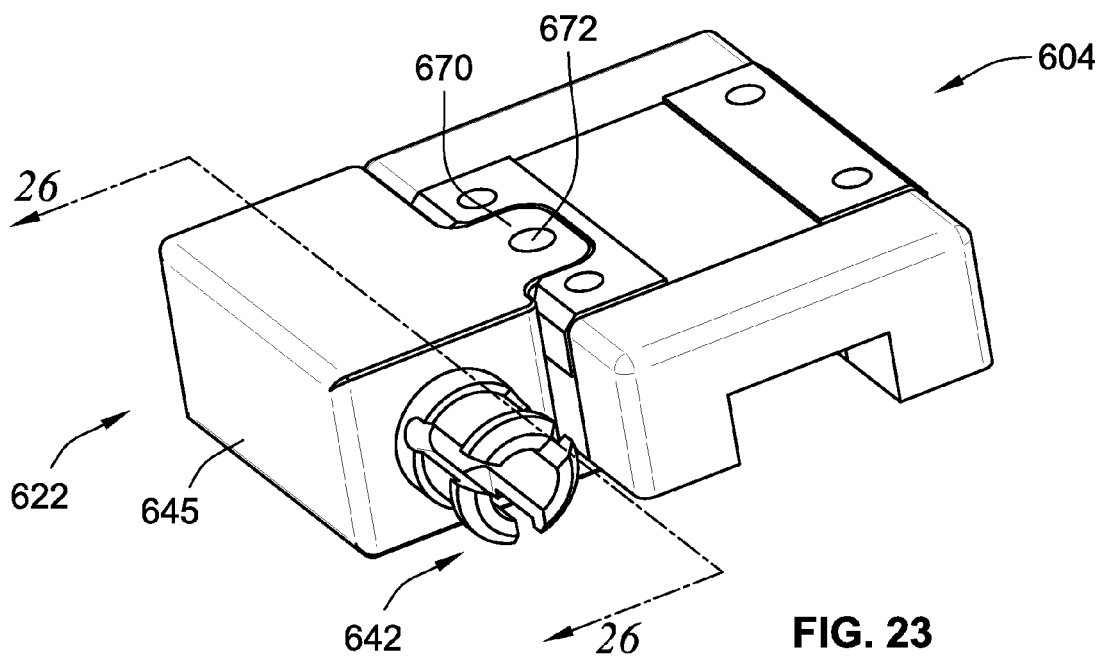
Figure 24:
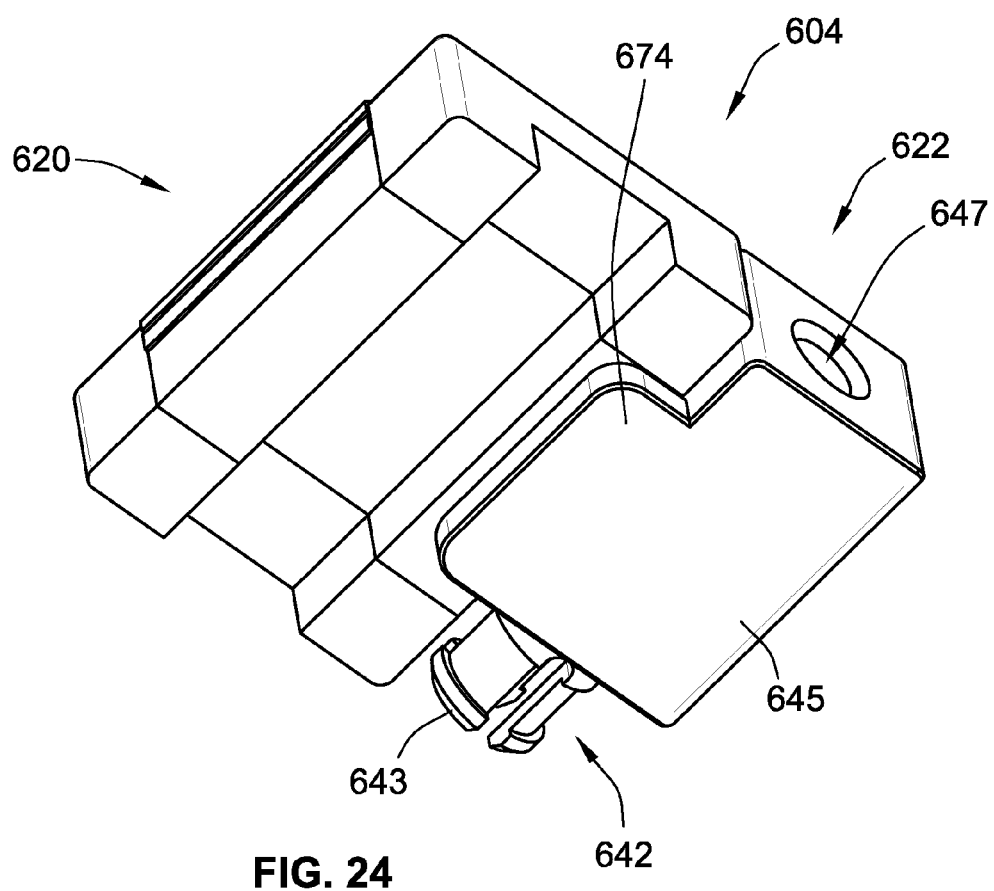

FIGS. 20 and 21 illustrate a further embodiment of a carriage arrangement 504. This carriage arrangement 504 includes a sidecar portion 522 that is integrally combined with the carriage body 526. In this embodiment, the carriage body 526 includes a cantilevered portion 525 that extends laterally outward. The sidecar portion 522 further includes a main body 538 attached to the carriage body 526. The main body 538 depends downward from the carriage body 526. The main body 538 includes an aperture that may be internally threaded to engage a corresponding screw or may alternatively receive a separate nut that is configured to engage a screw.

While the main body 538 and carriage body 526 are illustrated as separate components that are connected together, such as via screws, the two components could be welded or otherwise attached to one another. Further, the two components could be formed as a one-piece construction formed of a continuous piece of material, such as being machined from a continuous block of material or molded as a single component.

FIGS. 22-26 illustrate a further embodiment of a linear slide arrangement 600. This embodiment is similar to the embodiment of FIG. 1. However, in this embodiment the carriage arrangement 604 is slightly different.

In this embodiment, the carriage arrangement 604 includes a carriage portion 620 and a nut arrangement in the form of a sidecar 622. The carriage portion 620 is substantially similar to carriage portion 120 discussed above. The end caps of the carriage portion 620 are slightly different and are formed from molded plastic rather than the stamped metal as in the prior embodiments.

The sidecar 622 in this embodiment the sidecar 622 is a molded piece that includes a nut 642 that includes a plurality of flexible fingers 643 that extend axially from a base portion 645 generally parallel to the rotational axis of screw 612. The base portion 645 connects the flexible fingers 643 to one another but allows the flexible fingers 643 radially inward to compensate for wear between the nut 642 and the screw 612 as a result of use.

The flexible fingers 643 and base portion 645 generally define a central cavity 647 through which the screw 612 extends. At least a portion of the surface(s) bounding the central cavity 647 are internally threaded so as to cooperate with screw 612. More particularly, the base 645 may provide the threads, the flexible fingers 643 may provide the threads, or a combination of all or a part of the flexible fingers 643 and base 645 could provide the threads.

Figure 25:
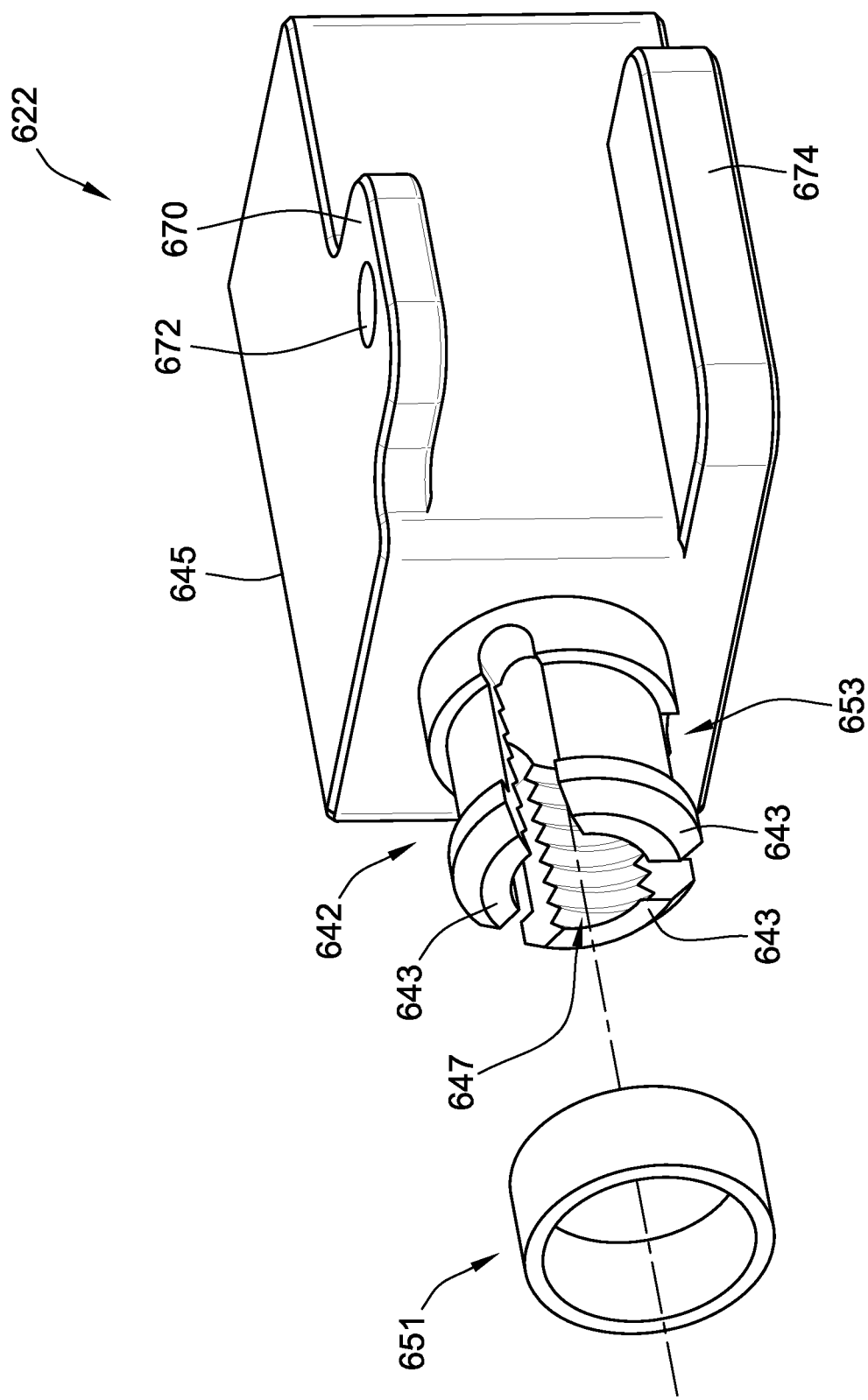
Figure 26:
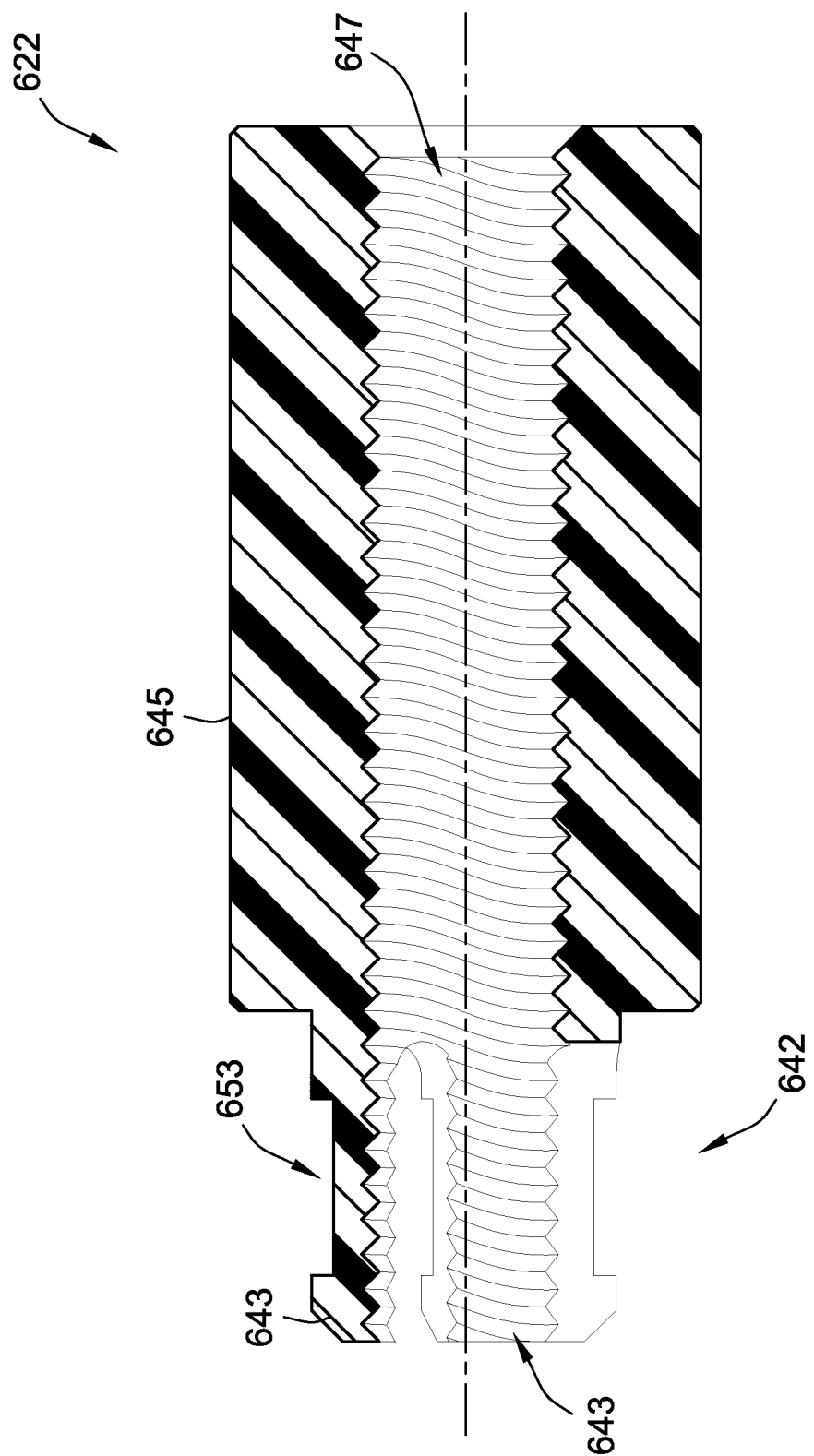

A radial compression member will be placed around the outer periphery of flexible fingers 643 to provide a radially inward directed compressive force to bias the fingers 643 towards screw 612. FIG. 25 illustrates one embodiment of a radial compression member in the form of a ring 651. Other compression members could be provided such as split rings or snap rings, o-rings, coil springs, constant force springs, etc.

The compression member, such as ring 651, will be positioned within groove 653 formed in the outer peripheries of fingers 643. The inner diameter of ring 651 is smaller than the outer diameter of the bottom of groove 653, at least when screw 612 extends through nut 642, such that the ring 651 provides the radially directed compressive forces. Other profiles can be provided in the outer peripheries of the fingers 643. For instance, multiple grooves can be provided. Further, when multiple grooves are provided different ones of the grooves can have different diameters for the bottoms thereof.

Further, different compression members may be configured to provide different radially directed forces so as allow a user to customize the force profile provided by the flexible fingers.

Further discussion of representative nuts using flexible fingers is provided in U.S. Pat. Appl. No. 61/579,699, filed Dec. 23, 2011, entitled Nut with Flexible Fingers and Radial Compression Members to Schroeder, the teachings and disclosures of which are incorporated herein in their entireties by reference thereto.

An attachment portion 670 extends laterally outward from base 645 much like attachment portion 170. The attachment portion 670 includes an aperture 672 for assisting in securing the sidecar 622 to the carriage portion 620.

A support flange 674 extends laterally outward generally parallel to attachment portion 670. The support flange extends underneath a bottom surface of the carriage portion 620 and assists in securing the sidecar 622 to the carriage portion 620. The support flange 674 and attachment portion 670 are spaced apart from one another and on the same side of base 645. They form a groove therebetween in which a portion, and particularly ball guide, of the carriage portion extends when the sidecar 622 is mounted to the carriage portion 620.

Preferably, the sidecar 622 is a single piece of molded and then machined material. More preferably, the sidecar 622 is formed from a plastic material that has low-friction characteristics when the nut 642, and particularly the flexible fingers 643 thereof, engages the screw 612.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A linear slide arrangement comprising:
 a guide rail;
 a carriage arrangement mounted to the guide rail for movement therealong, the carriage arrangement including:
  a carriage portion movably coupled to the guide rail, the carriage portion has a top surface to which objects are to be mounted; and
  a nut arrangement operably attached in fixed relation to the carriage portion, the nut arrangement being positioned at most flush with the top surface of the carriage portion, the nut arrangement including, at least, a nut;
 a drive mechanism including a screw, the screw being coupled to the nut of the carriage portion to move the carriage portion along the guide rail, the drive mechanism being spaced laterally to a side of the guide rail;
 wherein the carriage portion includes a ball guide forming at east a portion of a side of the carriage portion, the ball guide defining at least part of the nut arrangement;
 wherein the carriage portion includes a carriage body that defines at least part of the top surface, the ball guide being releasably attached to the carriage body, the nut is fixedly attached to the ball guide.
2. A linear slide arrangement comprising:
 a guide rail;

a carriage arrangement mounted to the guide rail for movement therealong, the carriage arrangement including:
  a carriage portion movably coupled to the guide rail, the carriage portion has a top surface to which objects are to be mounted; and
  a nut arrangement operably attached in fixed relation to the carriage portion, the nut arrangement being positioned at most flush with the top surface of the carriage portion, the nut arrangement including, at least, a nut;
a drive mechanism including a screw, the screw being coupled to the nut of the carriage portion to move the carriage portion along the guide rail, the drive mechanism being spaced laterally to a side of the guide rail;
wherein the nut arrangement is in the form of a sidecar affixed to the carriage portion, the sidecar including the nut; and
wherein the carriage portion includes a carriage body that defines the top surface, the carriage body includes a mounting cavity formed therein and recessed below the top surface, the sidecar including a cantilevered attachment portion that is shaped like and mates with the mounting cavity.

3. The linear slide arrangement of claim 2, wherein the sidecar including a frame structure that is fixedly attached to the carriage portion, the frame structure defines a nut channel in which the nut is affixed and prevented from axial motion relative to the frame structure generally parallel to the movement of the carriage portion along the guide rail.

4. The linear slide arrangement of claim 3, wherein the sidecar further includes an anti-backlash nut portion and a biasing member within the nut channel, the biasing member biasing the anti-backlash nut portion away from the nut, the anti-backlash nut portion axially slidable within the nut channel and coupled to the drive mechanism.

5. The linear slide arrangement of claim 2, wherein the carriage body includes a mounting recess formed in the mounting cavity and the attachment portion includes a mounting aperture, a mounting pin extends into both the mounting recess and the mounting aperture to affix the sidecar to the carriage body.

6. The linear slide arrangement of claim 2, wherein the sidecar is not attached to the top surface of the carriage portion.

7. The linear slide arrangement of claim 2, wherein the nut of the nut arrangement includes a plurality of flexible fingers that engage the drive arrangement.

8. A method of forming a linear slide arrangement having a carriage arrangement that includes a top surface to which objects are to be mounted and a guide rail, comprising:
  mounting the carriage arrangement to the guide rail for movement along the guide rail;
  affixing a nut arrangement to a carriage portion of the carriage arrangement such that the attachment of the nut arrangement does not interfere with the top surface of the carriage arrangement and the nut arrangement is positioned at most flush with the top surface of the carriage portion,
  wherein the not arrangement is in the form of a sidecar affixed to the carriage portion, the sidecar including the nut; and
  wherein the carriage includes a carriage body that defines the top surface, the method further including forming a mounting cavity into the carriage body recessed below the top surface, and affixing includes mating a cantilevered attachment portion of the sidecar with the mounting cavity;
  coupling a screw of a drive mechanism to the nut of the carriage portion to move the carriage portion along the guide rail, the drive mechanism being spaced laterally to a side of the guide rail.

* * * * *